US012299661B2

(12) United States Patent
Douthat et al.

(10) Patent No.: US 12,299,661 B2
(45) Date of Patent: *May 13, 2025

(54) CONTROLLING PROCESSOR'S ACCESS TO INTERFACE DEVICE

(71) Applicant: Block, Inc., Oakland, CA (US)

(72) Inventors: Cory Douthat, San Francisco, CA (US); Jason Binder, San Francisco, CA (US); Matthew Maibach, San Francisco, CA (US); Thomas Byrne, Oakland, CA (US)

(73) Assignee: Block, Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/628,864

(22) Filed: Apr. 8, 2024

(65) Prior Publication Data
US 2024/0249265 A1 Jul. 25, 2024

Related U.S. Application Data

(63) Continuation of application No. 17/667,032, filed on Feb. 8, 2022, now Pat. No. 11,983,688, which is a
(Continued)

(51) Int. Cl.
G06Q 20/20 (2012.01)
G06Q 20/38 (2012.01)

(52) U.S. Cl.
CPC ......... G06Q 20/206 (2013.01); G06Q 20/382 (2013.01)

(58) Field of Classification Search
CPC .. G06Q 20/206; G06Q 20/382; G06Q 20/204; G06Q 20/34; G06Q 20/4012;
(Continued)

(56) References Cited

U.S. PATENT DOCUMENTS 3,128,349 A * 4/1964 Nash ............... H04Q 1/453
327/39
4,758,714 A * 7/1988 Carlson ............. G07F 7/10
235/448
(Continued)

FOREIGN PATENT DOCUMENTS

AU 200223244 A 6/2002
DE 20320080 U1 4/2004
(Continued)

OTHER PUBLICATIONS

"Connection of Terminal Equipment to the Telephone Network," FCC 47 CFR Part 68, Retrieved from the URL: http://www.tscm.com/FCC47CFRpart68.pdf, on Sep. 24, 2019 Oct. 1, 1999 Edition, 157 pages.
(Continued)

Primary Examiner — Michael Jared Walker
(74) Attorney, Agent, or Firm — Polsinelli PC

(57) ABSTRACT

A point of sale (POS) device includes an output device such as a speaker, a display screen, or a network interface. The POS device also includes a secure enclosure housing a secure processor and tamper detection circuitry for detecting attempts to tamper with the secure enclosure. Use of the output device is shared between the secure processor and a main processor via a switch that is controlled by the secure processor. The secure processor can switch control of the output device from the main processor to itself and can output an output dataset via the output device in a number of scenarios. These scenarios include the secure processor detecting an attempt to tamper with the secure enclosure, the secure processor recognizing that the main processor is behaving suspiciously, or the secure processor wanting to output sensitive information. The output dataset may include visual data, audio data, or network data.

20 Claims, 18 Drawing Sheets

Related U.S. Application Data continuation of application No. 15/836,713, filed on Dec. 8, 2017, now Pat. No. 11,257,058.

(60) Provisional application No. 62/578,657, filed on Oct. 30, 2017.

(58) Field of Classification Search
CPC .. G06F 21/6209; G06F 21/6245; G06F 21/74; G06F 21/87; G07F 7/088; G07F 7/0893; G07G 1/01
See application file for complete search history.

(56) References Cited

U.S. PATENT DOCUMENTS

| | | | | |
|---|---|---|---|---|
| 4,776,003 A * | 10/1988 | Harris | G06Q 20/325 | 379/114.19 |
| 4,860,336 A * | 8/1989 | D'Avello | H04W 12/062 | D14/146 |
| 5,221,838 A * | 6/1993 | Gutman | G06Q 20/341 | 340/7.54 |
| 5,351,296 A * | 9/1994 | Sullivan | G07F 7/1016 | 379/93.12 |
| 5,388,155 A * | 2/1995 | Smith | H04B 1/385 | 379/426 |
| 5,408,513 A * | 4/1995 | Busch, Jr. | G07F 7/1008 | 379/91.01 |
| 5,714,741 A * | 2/1998 | Pieterse | H04M 1/2155 | 235/375 |
| 5,729,591 A * | 3/1998 | Bailey | H04M 17/02 | 379/91.01 |
| 5,740,232 A * | 4/1998 | Pailles | G06Q 20/363 | 379/93.02 |
| 5,752,046 A * | 5/1998 | Oprescu | G06F 1/305 | 713/340 |
| 5,838,773 A * | 11/1998 | Eisner | G06Q 20/26 | 379/91.01 |
| 5,850,599 A * | 12/1998 | Seiderman | H04M 17/00 | 455/406 |
| 5,867,795 A * | 2/1999 | Novis | G06Q 20/325 | 455/566 |
| 5,940,510 A * | 8/1999 | Curry | G06Q 20/40975 | 705/76 |
| 6,010,067 A * | 1/2000 | Elbaum | G06Q 20/04 | 235/375 |
| 6,065,679 A * | 5/2000 | Levie | H05K 1/0275 | 235/462.47 |
| 6,098,881 A * | 8/2000 | DeLand, Jr. | G06K 7/087 | 235/449 |
| 6,144,336 A * | 11/2000 | Preston | G01S 5/0027 | 455/456.5 |
| 6,234,389 B1 * | 5/2001 | Valliani | G06Q 30/06 | 705/64 |
| 6,278,779 B1 * | 8/2001 | Bryant | H04M 1/04 | 379/454 |
| 6,481,623 B1 * | 11/2002 | Grant | G06K 7/084 | 235/449 |
| 6,600,823 B1 * | 7/2003 | Hayosh | G06Q 20/3827 | 713/176 |
| 6,886,742 B2 * | 5/2005 | Stoutenburg | G07F 7/08 | 705/16 |
| 6,990,683 B2 * | 1/2006 | Itabashi | G06Q 20/40 | 705/16 |
| 7,003,316 B1 * | 2/2006 | Elias | H04M 1/72409 | 455/90.3 |
| 7,066,382 B2 * | 6/2006 | Kaplan | G07F 7/12 | 235/375 |
| 7,083,090 B2 * | 8/2006 | Zuili | G07F 7/0886 | 235/382 |
| 7,124,937 B2 * | 10/2006 | Myers | G06Q 20/10 | 235/382 |
| 7,163,148 B2 * | 1/2007 | Durbin | G06K 7/084 | |
| 7,210,627 B2 * | 5/2007 | Morley, Jr. | G07F 7/0813 | 235/449 |
| 7,343,496 B1 * | 3/2008 | Hsiang | G07F 9/105 | 361/672 |
| 7,363,054 B2 | 4/2008 | Elias et al. | | |
| 7,424,732 B2 * | 9/2008 | Matsumoto | G06Q 20/327 | 726/2 |
| 7,433,452 B2 * | 10/2008 | Taylor | H04M 15/90 | 379/93.12 |
| 7,502,878 B1 * | 3/2009 | Wright | G06F 13/4022 | 710/37 |
| 7,506,956 B2 * | 3/2009 | Usui | B41J 2/165 | 347/29 |
| 7,515,962 B2 * | 4/2009 | Lyden | G01R 31/3647 | 607/29 |
| 7,591,425 B1 | 9/2009 | Zuili et al. | | |
| 7,673,799 B2 * | 3/2010 | Hart | G07F 7/122 | 713/169 |
| 7,810,729 B2 * | 10/2010 | Morley, Jr. | G06Q 20/347 | 235/449 |
| 7,896,248 B2 * | 3/2011 | Morley, Jr. | G06K 7/083 | |
| 8,086,531 B2 * | 12/2011 | Litster | G07F 19/211 | 705/40 |
| 8,126,734 B2 * | 2/2012 | Dicks | G16H 10/60 | 710/16 |
| 8,265,553 B2 * | 9/2012 | Cheon | H04M 1/72409 | 361/679.41 |
| 8,355,003 B2 * | 1/2013 | Pope | A61B 1/00133 | 345/170 |
| 8,397,988 B1 * | 3/2013 | Zuili | G06Q 20/409 | 235/383 |
| 8,553,055 B1 * | 10/2013 | Martell | B41J 2/355 | 347/192 |
| 8,702,007 B2 * | 4/2014 | Yisraelian | G06K 19/0723 | 235/492 |
| 9,020,853 B2 * | 4/2015 | Hoffman | G06Q 20/3229 | 705/41 |
| 9,092,766 B1 * | 7/2015 | Bedier | G07G 1/0009 | |
| 9,223,376 B2 * | 12/2015 | Derbyshire | G06F 11/3013 | |
| 9,344,281 B2 * | 5/2016 | Kobres | H04L 9/3239 | |
| 9,355,277 B2 * | 5/2016 | Kobres | G06F 21/71 | |
| 9,396,368 B1 * | 7/2016 | Lamba | H04W 4/80 | |
| 9,489,703 B2 * | 11/2016 | Kauniskangas | G16H 30/20 | |
| 9,529,758 B1 * | 12/2016 | Szeto | G06F 13/364 | |
| 9,590,747 B2 * | 3/2017 | Thoukydides | H04B 17/21 | |
| 9,607,181 B2 * | 3/2017 | Matsumoto | G06F 21/86 | |
| 9,659,441 B2 * | 5/2017 | Kelly | G07F 17/323 | |
| 9,679,286 B2 | 6/2017 | Colnot et al. | | |
| 9,721,247 B2 * | 8/2017 | Bedier | G06Q 20/4016 | |
| 9,792,783 B1 * | 10/2017 | Beatty | G06Q 20/202 | |
| 10,182,328 B1 * | 1/2019 | Maibach | H01Q 1/2216 | |
| 10,339,307 B2 * | 7/2019 | Dabosville | G06F 21/552 | |
| 10,713,904 B2 * | 7/2020 | Beatty | G07G 1/0009 | |
| 10,733,589 B2 * | 8/2020 | Douthat | G06F 1/3243 | |
| 10,970,698 B1 * | 4/2021 | Binder | G06Q 20/20 | |
| 11,257,058 B1 * | 2/2022 | Douthat | G06F 21/74 | |
| 2002/0091633 A1 * | 7/2002 | Proctor | G06Q 20/20 | 705/39 |
| 2002/0153414 A1 * | 10/2002 | Stoutenburg | G06Q 20/04 | 235/380 |
| 2003/0135418 A1 * | 7/2003 | Shekhar | G06Q 30/06 | 705/16 |
| 2003/0154414 A1 * | 8/2003 | von Mueller | G06K 7/084 | 713/300 |
| 2003/0183691 A1 * | 10/2003 | Lahteenmaki | G06K 7/0008 | 235/441 |
| 2003/0200108 A1 * | 10/2003 | Malnoe | G06Q 30/02 | 705/16 |
| 2004/0012875 A1 * | 1/2004 | Wood | G06K 7/084 | 360/55 |
| 2004/0041911 A1 * | 3/2004 | Odagiri | G06F 1/1632 | 348/E5.042 |
| 2004/0059682 A1 * | 3/2004 | Hasumi | G06Q 20/12 | 705/64 |
| 2004/0088449 A1 * | 5/2004 | Sakaki | G06F 13/385 | 710/15 |

(56) References Cited

U.S. PATENT DOCUMENTS

| | | | |
|---|---|---|---|
| 2004/0167820 A1* | 8/2004 | Melick | G06Q 20/343 705/16 |
| 2004/0204082 A1* | 10/2004 | Abeyta | G06Q 20/04 455/556.1 |
| 2004/0251908 A1* | 12/2004 | Knopf | G01R 31/3648 324/426 |
| 2005/0097015 A1* | 5/2005 | Wilkes | G06Q 20/04 705/30 |
| 2005/0109841 A1* | 5/2005 | Ryan | G06F 13/385 235/380 |
| 2005/0179956 A1* | 8/2005 | Silverbrooks | B41J 13/103 347/85 |
| 2005/0236480 A1* | 10/2005 | Vrotsos | G07F 7/0886 235/462.46 |
| 2006/0032905 A1* | 2/2006 | Bear | G06K 7/0008 235/380 |
| 2006/0049255 A1* | 3/2006 | von Mueller | G07F 7/0886 235/449 |
| 2006/0049256 A1* | 3/2006 | von Mueller | G06Q 20/3552 705/64 |
| 2006/0056401 A1* | 3/2006 | Bohm | G06F 13/4022 370/360 |
| 2006/0223580 A1* | 10/2006 | Antonio | H04M 1/72409 455/569.1 |
| 2007/0067833 A1* | 3/2007 | Colnot | H04L 63/0853 726/9 |
| 2007/0168300 A1* | 7/2007 | Quesselaire | G06Q 20/20 705/79 |
| 2007/0194104 A1* | 8/2007 | Fukuda | G06Q 20/3437 235/379 |
| 2007/0198436 A1* | 8/2007 | Weiss | G06F 21/6245 705/75 |
| 2007/0255885 A1* | 11/2007 | Bohm | G06F 13/4022 710/316 |
| 2008/0091617 A1* | 4/2008 | Hazel | G06Q 20/085 705/73 |
| 2008/0104631 A1* | 5/2008 | Krock | G08B 7/06 725/32 |
| 2008/0148394 A1* | 6/2008 | Poidomani | G06F 21/81 726/20 |
| 2008/0238687 A1* | 10/2008 | Ozer | G06K 19/07771 340/572.7 |
| 2009/0070583 A1 | 3/2009 | Von Mueller et al. | |
| 2009/0112768 A1* | 4/2009 | Hammad | G06Q 20/3825 705/44 |
| 2009/0164326 A1* | 6/2009 | Bishop | G06Q 20/04 705/19 |
| 2009/0271270 A1* | 10/2009 | Regmi | G06Q 30/02 705/14.56 |
| 2009/0317161 A1* | 12/2009 | Vo | B41J 15/042 400/207 |
| 2010/0057620 A1* | 3/2010 | Li | G07F 7/0826 235/380 |
| 2010/0220136 A1* | 9/2010 | Sheahan | B41J 2/0455 347/10 |
| 2010/0243732 A1* | 9/2010 | Wallner | G06Q 20/34 455/414.1 |
| 2011/0007834 A1 | 1/2011 | Hoshino et al. | |
| 2011/0019234 A1* | 1/2011 | Nakamura | G06F 3/1291 358/1.15 |
| 2011/0078034 A1* | 3/2011 | Hayhow | G06Q 30/0185 705/21 |
| 2011/0080422 A1* | 4/2011 | Lee | G06F 1/3203 345/589 |
| 2011/0321173 A1* | 12/2011 | Weston | G07F 7/1016 726/27 |
| 2012/0039469 A1* | 2/2012 | Mueller | G06Q 20/204 380/252 |
| 2012/0060041 A1* | 3/2012 | Hashimoto | H04N 1/00896 713/310 |
| 2012/0203620 A1* | 8/2012 | Dobyns | G06Q 30/0236 705/16 |
| 2013/0013515 A1* | 1/2013 | Walters | G07F 7/1016 726/16 |
| 2013/0079037 A1* | 3/2013 | Dobyns | H04W 4/029 455/456.3 |
| 2013/0094668 A1* | 4/2013 | Poulsen | H03G 3/301 381/107 |
| 2013/0103190 A1* | 4/2013 | Carapelli | G07F 9/026 700/237 |
| 2013/0110678 A1* | 5/2013 | Vigier | G06Q 30/06 705/26.61 |
| 2013/0262708 A1* | 10/2013 | McLeod | H04L 67/131 710/2 |
| 2014/0021254 A1* | 1/2014 | Marshall | G06K 7/0091 361/752 |
| 2014/0108241 A1* | 4/2014 | Tunnell | G06Q 20/321 705/41 |
| 2014/0127995 A1* | 5/2014 | Hendricksen | G06K 19/0723 455/41.1 |
| 2014/0191913 A1* | 7/2014 | Ge | H01Q 1/44 343/720 |
| 2014/0206339 A1* | 7/2014 | Lindoff | H04W 4/029 455/419 |
| 2014/0241523 A1* | 8/2014 | Kobres | G06F 21/71 380/28 |
| 2014/0249942 A1* | 9/2014 | Hicks | G06Q 20/20 705/17 |
| 2014/0268458 A1* | 9/2014 | Luciani | H02H 1/043 361/87 |
| 2014/0295777 A1* | 10/2014 | Wang | H03H 7/38 455/75 |
| 2014/0368339 A1* | 12/2014 | Thaker | G08B 21/24 340/539.32 |
| 2015/0199882 A1* | 7/2015 | Fernando | G07G 1/0018 345/173 |
| 2015/0227485 A1* | 8/2015 | Maung | G06F 13/4022 710/316 |
| 2015/0254621 A1* | 9/2015 | Matsumoto | G06K 7/01 705/16 |
| 2015/0269805 A1* | 9/2015 | Korala | G06F 21/83 713/194 |
| 2015/0302708 A1* | 10/2015 | Hattori | H01Q 21/28 705/16 |
| 2016/0014623 A1* | 1/2016 | Tanner | H04B 5/70 455/552.1 |
| 2016/0064979 A1* | 3/2016 | Huang | H02J 7/0071 320/114 |
| 2016/0098690 A1* | 4/2016 | Silva | G06Q 20/202 705/21 |
| 2016/0117662 A1* | 4/2016 | Bedier | G06Q 20/209 705/17 |
| 2016/0125376 A1* | 5/2016 | Beatty | G06Q 20/202 705/72 |
| 2016/0174038 A1* | 6/2016 | Menardais | H04L 67/75 340/539.11 |
| 2016/0211843 A1* | 7/2016 | Wang | H03K 19/003 |
| 2016/0275478 A1 | 9/2016 | Li et al. | |
| 2016/0307010 A1* | 10/2016 | Ge | G06K 7/10386 |
| 2016/0307171 A1* | 10/2016 | Haga | G06Q 10/105 |
| 2016/0335132 A1* | 11/2016 | Ash | G06F 9/505 |
| 2017/0004485 A1* | 1/2017 | Lee | G06Q 20/3226 |
| 2017/0017943 A1* | 1/2017 | Bilhan | G06Q 20/206 |
| 2017/0076269 A1* | 3/2017 | Saeed | G07G 1/0018 |
| 2017/0160819 A1* | 6/2017 | Yi | G06F 3/03 |
| 2017/0220822 A1* | 8/2017 | Kobres | G06F 21/82 |
| 2017/0255927 A1* | 9/2017 | Dorsey | G06Q 20/322 |
| 2017/0300893 A1* | 10/2017 | Sasaki | G06Q 20/209 |
| 2017/0309135 A1* | 10/2017 | Beatty | G07G 1/0009 |
| 2017/0309137 A1* | 10/2017 | Shah | G06Q 20/209 |
| 2017/0337403 A1* | 11/2017 | Ohno | H04B 5/70 |
| 2018/0026373 A1* | 1/2018 | Schwent | H01Q 21/28 343/748 |
| 2018/0314661 A1* | 11/2018 | Douthat | G06F 13/426 |
| 2018/0316815 A1* | 11/2018 | Douthat | G06F 1/28 |
| 2018/0366978 A1* | 12/2018 | Matan | G05B 19/042 |

(56) References Cited

U.S. PATENT DOCUMENTS

| | | | |
|---|---|---|---|
| 2020/0334657 A1* | 10/2020 | Douthat | G06F 1/324 |
| 2021/0216988 A1* | 7/2021 | Binder | G07F 9/009 |
| 2022/0164782 A1 | 5/2022 | Douthat et al. | |

FOREIGN PATENT DOCUMENTS

| | | |
|---|---|---|
| EP | 0 895 203 A2 | 2/1999 |
| EP | 1 874 014 A2 | 1/2008 |
| FR | 2 812 744 A1 | 2/2002 |
| FR | 2 812 745 A1 | 2/2002 |
| FR | 2 834 156 A1 | 6/2003 |
| JP | H09231285 A | 9/1997 |
| JP | 2000-030146 A | 1/2000 |
| JP | 2000-276539 A | 10/2000 |
| JP | 2001-222595 A | 8/2001 |
| JP | 2002-074507 A | 3/2002 |
| JP | 2002-123771 A | 4/2002 |
| JP | 2002-279320 A | 9/2002 |
| JP | 2002-352166 A | 12/2002 |
| JP | 2002-358285 A | 12/2002 |
| JP | 2003-108777 A | 4/2003 |
| JP | 2003-281453 A | 10/2003 |
| JP | 2003-308438 A | 10/2003 |
| JP | 2004-054651 A | 2/2004 |
| JP | 2004-062733 A | 2/2004 |
| JP | 2004-078553 A | 3/2004 |
| JP | 2004-078662 A | 3/2004 |
| JP | 2004-199405 A | 7/2004 |
| JP | 4248820 B2 | 4/2009 |
| KR | 10-1999-0066397 A | 8/1999 |
| KR | 10-1999-0068618 A | 9/1999 |
| KR | 200225019 B1 | 3/2001 |
| KR | 10-2003-0005936 A | 1/2003 |
| KR | 10-2003-0005984 A | 1/2003 |
| KR | 10-2003-0012910 A | 2/2003 |
| KR | 200333809 B1 | 11/2003 |
| KR | 10-2004-0016548 A | 2/2004 |
| KR | 100447431 B1 | 8/2004 |
| KR | 200405877 B1 | 1/2006 |
| KR | 100649151 B1 | 11/2006 |
| KR | 10-2007-0107990 A | 11/2007 |
| KR | 100842484 B1 | 7/2008 |
| RU | 2284578 C1 | 9/2006 |
| WO | 98/12674 A2 | 3/1998 |
| WO | 2000/011624 A1 | 3/2000 |
| WO | 2000/025277 A1 | 5/2000 |
| WO | 2001/086599 A2 | 11/2001 |
| WO | 2002/033669 A1 | 4/2002 |
| WO | 2002/043020 A2 | 5/2002 |
| WO | 2002/082388 A1 | 10/2002 |
| WO | 2002/084548 A1 | 10/2002 |
| WO | 2003/044710 A1 | 5/2003 |
| WO | 2003/079259 A1 | 9/2003 |
| WO | 2004/023366 A1 | 3/2004 |
| WO | 2006/131708 A1 | 12/2006 |

OTHER PUBLICATIONS

"Embedded FINancial transactional IC card READer," Retrieved from the URL: <https://cordis.europa.eu/project/rcn/58338/factsheet/en>, Accessed on Nov. 6, 2019, 2 pages.

Venkataramani et al., "Mobile phone based RFID architecture for secure electronic payments using RFID credit cards," 2007 IEEE, (ARES'07), 8 pages.

"Guideline for the Use of Advanced Authentication Technology," FIPS 190, NIST Sep. 28, 1994, 62 pages.

"Identification cards—Recording technique—Part 4—Location of read-only magnetic tracks—Track 1 and 2," ISO/IEC 7811-4:1995, International Organization for Standardization, Aug. 1995, 7 pages.

Jerome S., "The Long Life and Imminent Death of the Mag-stripe Card," IEEE Spectrum, vol. 49, Issue 61, Jun. 2012, pp. 74-76.

"Magensa's Decryption Services and MagTek's MagneSafe™ Bluetooth Readers Selected by eProcessing Network to Implement Secure Customer Card Data with Mobile Devices," Retrieved from the URL: https://www.magnensa.net/aboutus/articles/eProcessing - rev1.pdf, Apr. 14, 2008, 3 pages.

Haykin et al., "Smart Card Technology: New Methods for Computer Access Control," NIST Special Publication 500-157, Sep. 1988, 60 pages.

"MSP430x1xx Family User's Guide," (including 2016 correction sheet at 2), Texas Instruments Inc., 2006, 415 pages.

Spegele J. B., "A Framework for Evaluating Application of Smart Cards and Related Technology Within the Department of Defense," Naval Postgraduate School, Jan. 1995, 194 pages.

Sherman et al., "Secure Network Access Using Multiple Applications of AT&T's Smart Card," AT&T Technical Journal, Sep./Oct. 1994, pp. 61-72.

\* cited by examiner

CONTROLLING PROCESSOR'S ACCESS TO INTERFACE DEVICE

CROSS-REFERENCE TO RELATED APPLICATIONS

This application is a continuation of U.S. Non-Provisional patent application Ser. No. 17/667,032, entitled CONTROLLING ACCESS TO OUTPUT DEVICE BETWEEN TWO PROCESSORS, filed Feb. 8, 2022, which is a continuation of U.S. Non-Provisional patent application Ser. No. 15/836,713, entitled SHARING OUTPUT DEVICE BETWEEN UNSECURED PROCESSOR AND SECURED PROCESSOR, filed Dec. 8, 2017, now U.S. Pat. No. 11,257,058, which claims the benefit of U.S. Provisional Patent Application No. 62/578,657, entitled SHARING OUTPUT DEVICE BETWEEN UNSECURED PROCESSOR AND SECURED PROCESSOR, filed Oct. 30, 2017, the contents of which are incorporated herein by reference in their entireties.

BACKGROUND

Payment object reading devices are devices that read information from payment objects, such as credit cards. Payment object reading devices typically include circuitry that reads, stores, or conveys sensitive information such as a customer's credit card number or personal identification number ("PIN"). If such circuitry of the payment object reader is left unprotected, a malicious party could potentially retrieve a customer's sensitive information by accessing the circuitry of the payment object reader that reads, stores, or conveys the sensitive information.

A secure enclosure refers to an enclosure or housing that includes tamper detection circuitry integrated into the enclosure or housing itself. Circuitry that is within the secure enclosure is protected or secured, while circuitry that is outside of the secure enclosure is generally unprotected and unsecured. A processor can be within a secure enclosure to protect or secure the processor. Tamper detection circuitry can interface with such a secured processor to help the secured processor identify an attempt by a malicious party to tamper with the secure enclosure.

An output device such as a speaker or a display can be controlled by a processor to output audio or to display visual media, respectively.

There is a need in the art for sharing of output devices between a secured processor and an unsecured processor, for example in a payment object reading device.

DETAILED DESCRIPTION

A point of sale (POS) device includes an output device such as a speaker, a display screen, or a network interface. The POS device also includes a secure enclosure housing a secure processor and tamper detection circuitry for detecting attempts to tamper with the secure enclosure. Use of the output device is shared between the secure processor and a main processor via a switch that is controlled by the secure processor. The secure processor can switch control of the output device from the main processor to itself and can output an output dataset via the output device in a number of scenarios. These scenarios include the secure processor detecting an attempt to tamper with the secure enclosure, the secure processor recognizing that the main processor is behaving suspiciously, or the secure processor wanting to output sensitive information. The output dataset may include visual data, audio data, or network data.

Figure 1A:
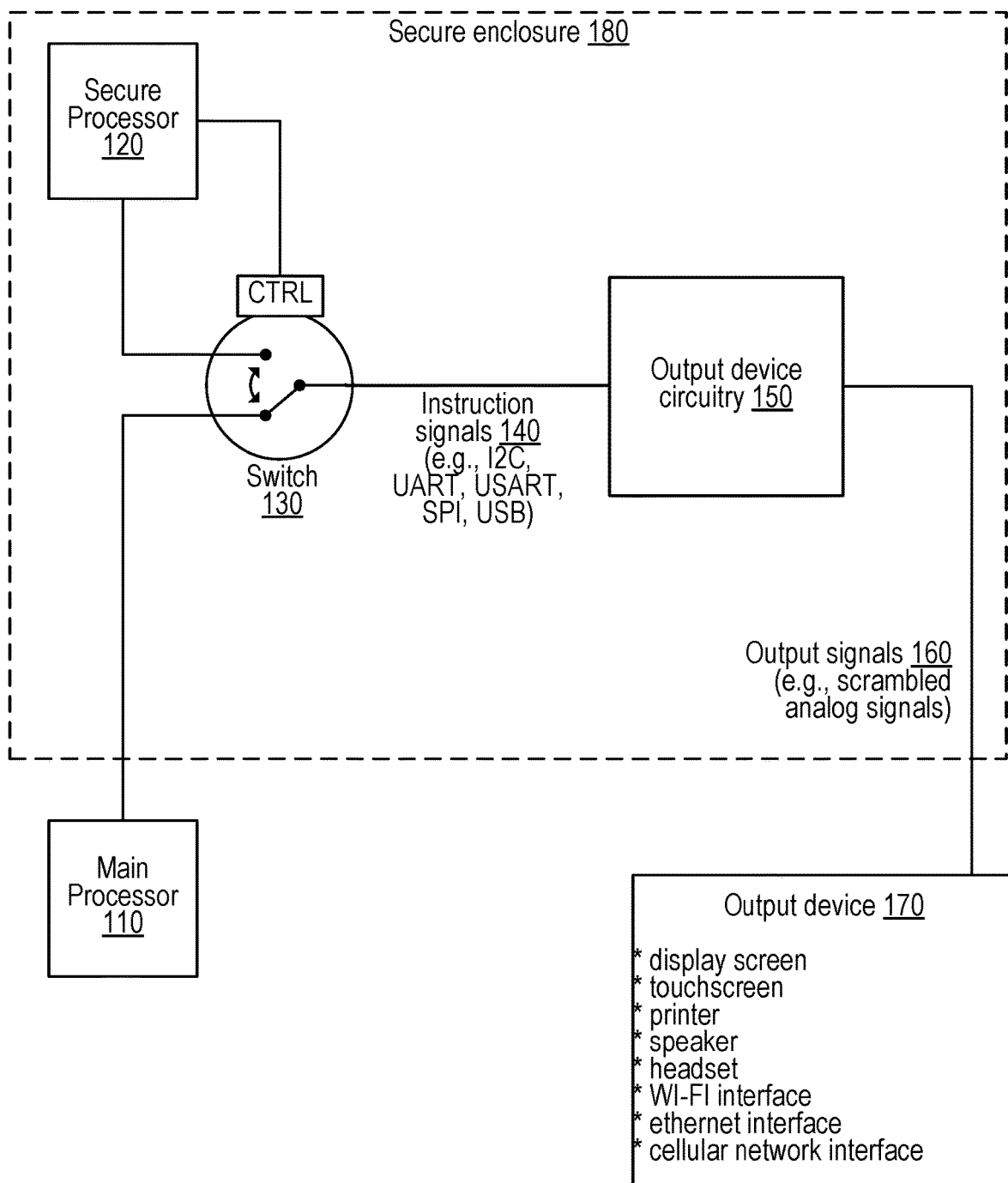
FIG. 1A is a block diagram illustrating a main processor and a secure processor sharing an output device via a switch, where output device circuitry is within a secure enclosure.

FIG. 1A is a block diagram illustrating a main processor and a secure processor sharing an output device via a switch, where output device circuitry is within a secure enclosure. These components may be within a point of sale (POS) device and/or a payment/transaction object reader.

The terms "main processor 110" and "secure processor 120" as used herein should be understood to each include a set of one or more of any type of processor(s), controller(s), microcontroller(s), application specific integrated circuit(s) (ASIC), or combinations thereof. The "main processor 110" and "secure processor 120" may include any circuit board component illustrated or discussed with respect to the "processor(s)/controller(s) 710" or any of the rest of the circuit board components 700 illustrated or discussed with respect to FIG. 7.

The main processor 110 and/or secure processor 120 may run a one or more operating systems such as Google® Android®, Apple® iOS®, Microsoft® Windows®, Google® Chrome OS®, Apple® MacOS®, Microsoft® Windows Phone OS®, a distribution of Linux®, or some combination thereof. The main processor 110 and/or secure processor 120 may include instructions for one or more applications, such as financial applications, point of sale (POS) applications, transit pass applications, or ticketing applications that may send data acquired from transaction object reader circuitry 770 as illustrated and discussed with respect to FIG. 7 to a financial server, credit card server, bank server, transit card server, or ticketing server for processing. These applications may also generate one or more user interfaces, such as a financial user interface, a POS user interface, a transit pass user interface, or a ticketing user interface. In one embodiment, the main processor 110 runs a Google® Android® OS and generates a main user interface via an Android® application that acquires data from the transaction object reader circuitry 770 and optionally via a user interface such as a keyboard, a number pad, touchscreen, or touch-sensitive surface. Such a user interface may be used to receive a user's personal identification number (PIN) code, a user's signature, a user's selection in response to a charity donation request, a user's selection in response to a question asking whether or not the user desires a receipt and/or if the user would like a printed receipt or an electronic receipt sent to the user's electronic device, or identifying information about the user such as a name, physical address, e-mail address, or phone number.

The output device 170 of FIG. 1A may include, for example, a display screen, a touchscreen, a printer, a speaker, a headset interface such as an audio jack, a wireless local area network (WLAN) interface, a 802.xx Wi-Fi interface, an Ethernet interface, a local area network (LAN) interface, a cellular network interface, or some combination thereof. The output device circuitry 150 may include drivers, codecs, controllers, processors, combinations thereof, or any other circuitry used to connect to, control, and/or drive output device 170.

The switch 130 allows either the secure processor 150 or the main processor 110 electrically couple to and thereby control output device circuitry 150 that electrically couples to, controls, and/or drives the output device 170. The switch 130 may be or include at least a transistor, such as a field effect transistor (FET).

The state of the switch 130 is controlled by the secure processor 150 via a control input/pin, such as a gate pin of a transistor. The switch 130 is located inside the secure enclosure 180 to prevent a main processor 110 that is misbehaving, malfunctioning, or compromised by a malicious party from inappropriately taking control of the output device circuitry 150. Alternate embodiments could have the switch 130 located outside of the secure enclosure 180 and/or controlled by the main processor 110, but this would likely be less secure in the event of a misbehaving main processor 110.

The switch 130 of FIG. 1A is illustrated in a first state in which the main processor 110 is electrically coupled through the switch 130 to the output device circuitry 140 and eventually to the output device 170. An arrow is illustrated in FIG. 1A showing how the switch would be toggled from the first state to a second state in which the secure processor 120 is electrically coupled through the switch 130 to the output device circuitry 140 and eventually to the output device 170. The switch 130 in FIG. 1B and FIG. 1C is shown in the second state, with a similar arrow showing how the switch would be toggled from the second state to the first state.

Instruction signals 140 coming from either processor through the switch 130 and to the output device circuitry 150 may be digital signals using control/communication protocols and/or standards such as Inter-Integrated Circuit (I2C), Universal Asynchronous Receiver/Transmitter (UART), Universal Synchronous/Asynchronous Receiver/Transmitter (USART), Serial Peripheral Interfaces (SPI), Universal Serial Bus (U6B), or some combination thereof. Output signals 160 between the output device circuitry 150 and the output device 170 may include analog signals and may be scrambled, encrypted, filtered, use a proprietary or non-standard format, be otherwise difficult to interpret, or some combination thereof. Scrambling may involve sending different portions of information in an unusual order, for example. Generally, output signals 160 are more difficult to interpret than the instruction signals 140 and therefore it is safer for them to be conveyed outside of the secure enclosure 180 than for the instruction signals 140 to be conveyed outside of the secure enclosure 180. The output device circuitry 150 of FIG. 1A provides this added security because it is within the security enclosure 180.

The output device circuitry 150 may include hardware and/or software elements that restrict and/or prevent information from flowing "backwards" through the switch 130 from the from the output device 170 and to the secure processor 120, in case a malicious party attempts to access or alter the secure processor 150 in this manner. The hardware and/or software elements that restrict and/or prevent information from flowing "backwards" through the switch 130 may include diodes, such as isolation diodes.

Figure 1B:
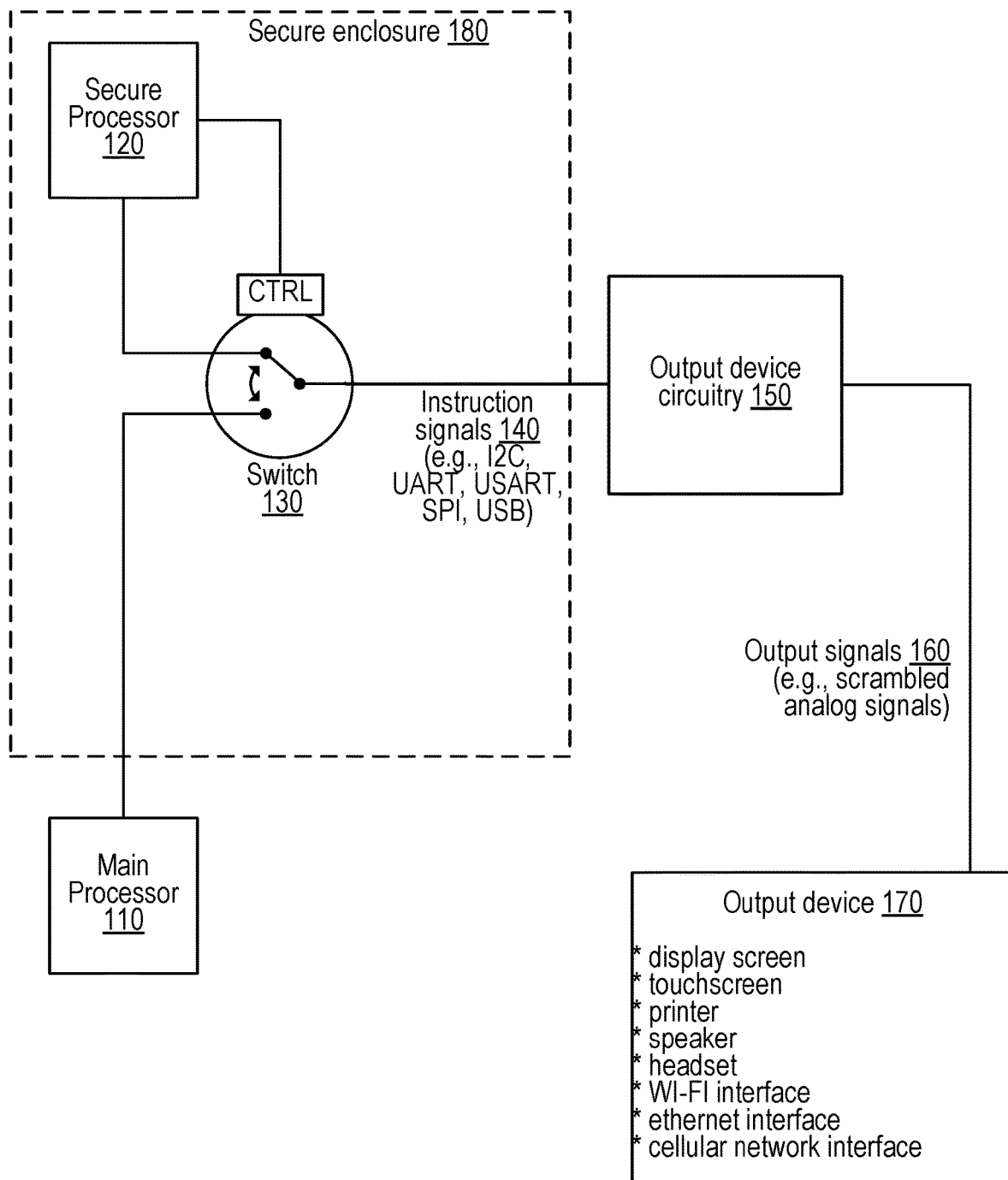
FIG. 1B is a block diagram illustrating a main processor and a secure processor sharing an output device via a switch, where output device circuitry is outside of a secure enclosure.
Figure 1C:
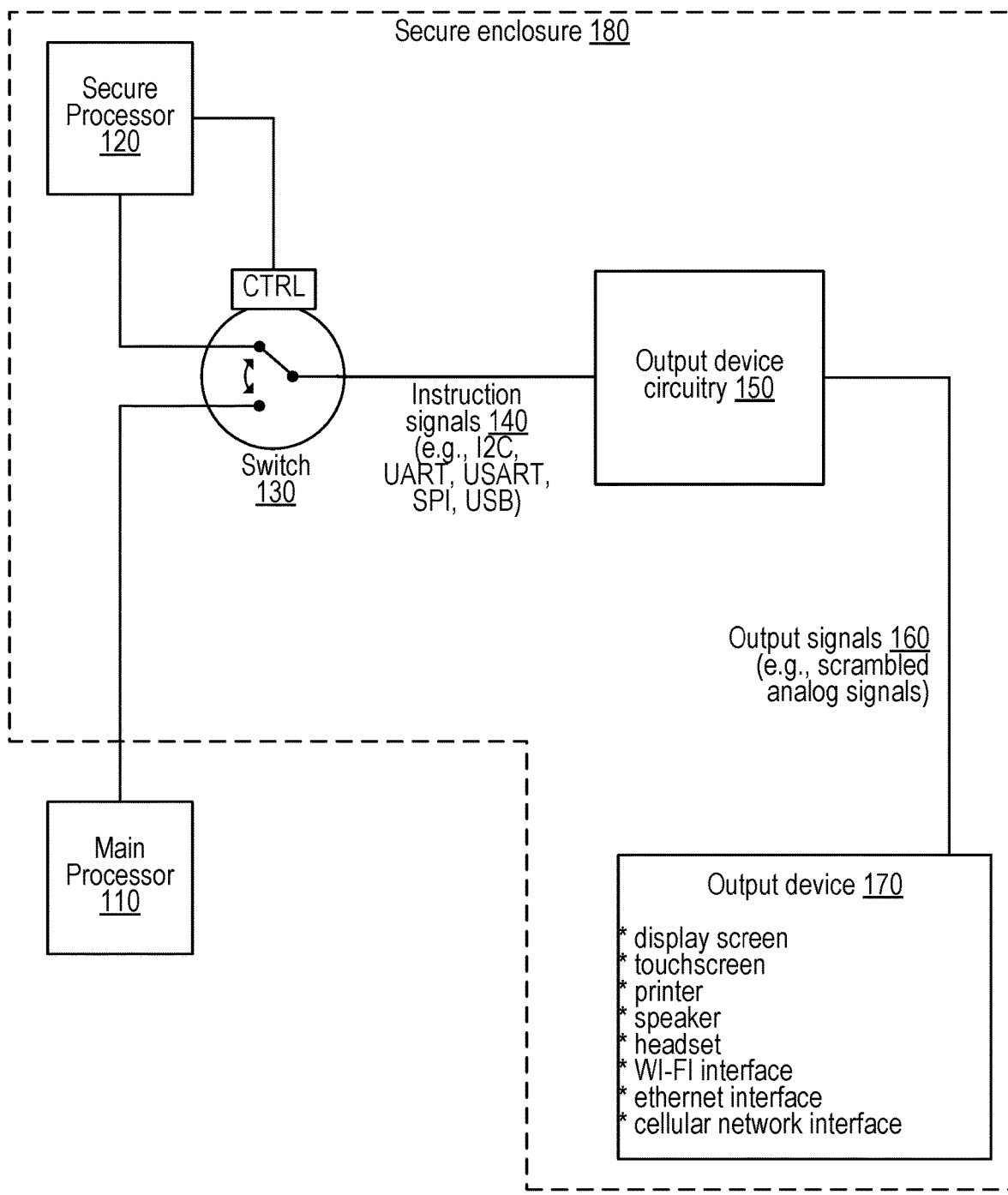
FIG. 1C is a block diagram illustrating a main processor and a secure processor sharing an output device via a switch, where output device is inside of a secure enclosure.

FIG. 1B is a block diagram illustrating a main processor and a secure processor sharing an output device via a switch, where output device circuitry is outside of a secure enclosure.

The switch 130 of FIG. 1B and FIG. 1C is shown in the second state, in which the secure processor 120 is electrically coupled through the switch 130 to the output device circuitry 140 and eventually to the output device 170. An arrow is also illustrated at the switch 130 of FIG. 1B and FIG. 1C showing how the switch 130 would be toggled from the second state to the first state that is illustrated in FIG. 1A.

The output device circuitry 150 of FIG. 1B is outside of the secure enclosure 180 rather than inside the secure enclosure 180, unlike in FIG. 1A where the output device circuitry 150 was inside the secure enclosure 180. In reality, a first subset of the output device circuitry 150 may be outside of the secure enclosure 180 as in FIG. 1B, while a second subset of the output device circuitry 150 may be within the secure enclosure 180 as in FIG. 1A.

FIG. 1C is a block diagram illustrating a main processor and a secure processor sharing an output device via a switch, where output device is inside of a secure enclosure.

The architecture illustrated in FIG. 1C is the most secure in comparison to the architectures illustrated in FIG. 1A or FIG. 1B because the output device 170 itself is located within the secure enclosure 180, and because the output signals 160 are conveyed solely within the secure enclosure 180 as well.

The architecture illustrated in FIG. 1C may also be somewhat restrictive and more difficult and expensive to build, however. Certain output devices 170, by their nature, are best suited to be at least partially located along an exterior surface of a device, such as display screens, touchscreens, speakers, headphone jacks, or printers—for such output devices 170, it may be difficult to place them within the secure enclosure 180. Some of these and other output devices 170 may be moved more internal to the devices in which they are located to make it more feasible to enclose them in the secure enclosure 180, but it is difficult to do so without compromising output quality by, for example, muffling sound from a speaker, muddying visuals from a display screen, or weakening signals from a wireless network transceiver. However, certain output devices 170 might not be affected much by this, such as certain types of wireless network transceivers, such as those that use tamper mesh from tamper detection circuitry as a form of transceiver antenna, or certain types of touchscreen, such as those that use touch-sensitive layer lines as a tamper mesh for the tamper detection circuitry.

The architecture illustrated in FIG. 1C, like architecture illustrated in FIG. 1B, is illustrated with the switch 130 in the second state in which the secure processor 120 is electrically coupled through the switch 130 to the output device circuitry 140 and eventually to the output device 170.

An output-sharing circuit can be made with any combination of features/elements illustrated in and/or discussed with respect to FIGS. 3A-3B, FIGS. 4A-4E, FIGS. 5A-5B, FIGS. 6A-6B, or FIG. 7.

Figure 2A:
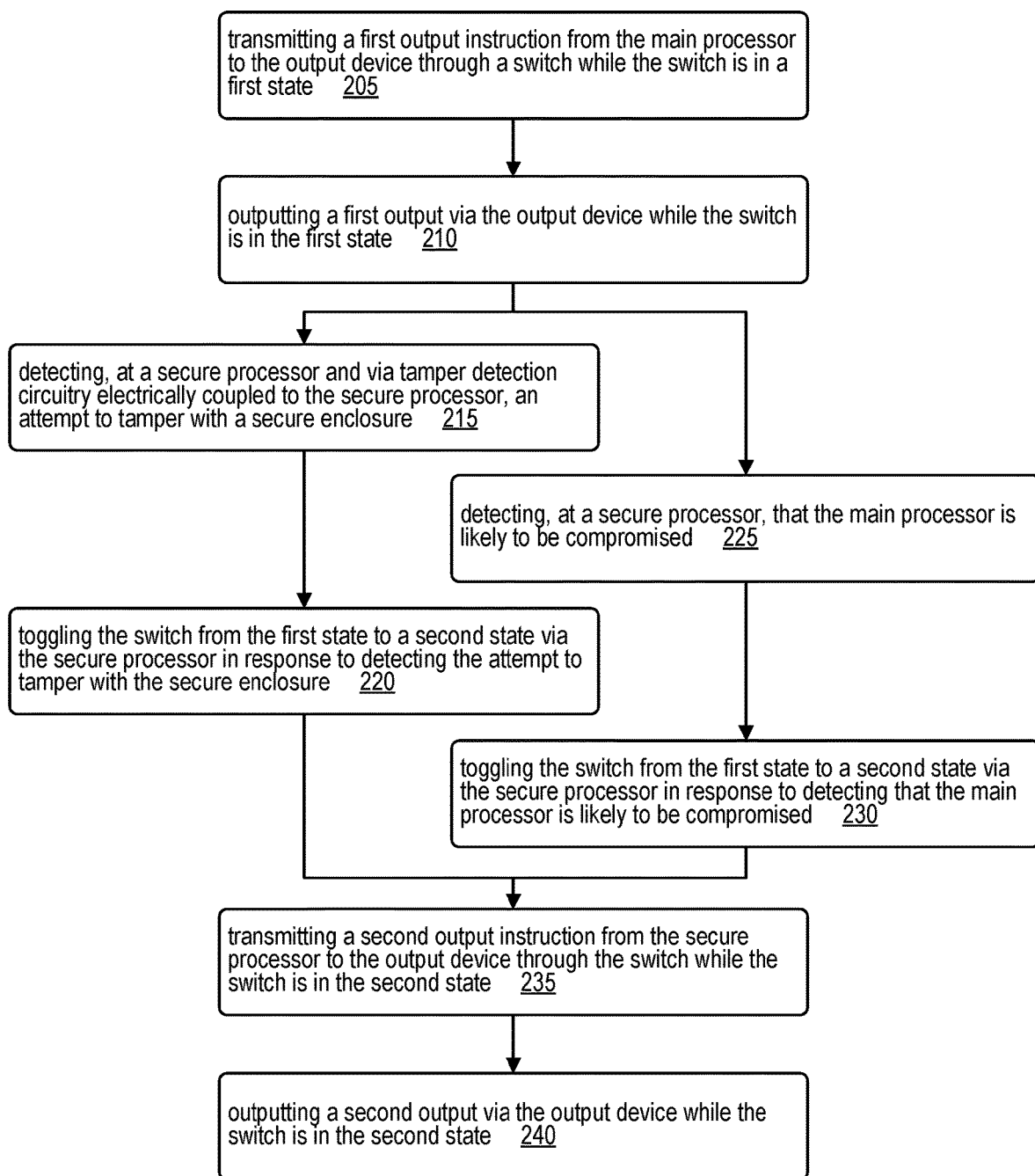
FIG. 2A is a flow diagram illustrating switching from a first state in which a main processor controls an output device to a second state in which a secure processor controls an output device in response to detection of tampering or a compromised main processor.

FIG. 2A is a flow diagram illustrating switching from a first state in which a main processor controls an output device to a second state in which a secure processor controls an output device in response to detection of tampering or a compromised main processor.

Step 205 includes transmitting a first output instruction from the main processor 110 to the output device through a switch 130 while the switch 130 is in a first state. This first output instruction may be, for example, an instruction from a transaction application running on the main processor 110 to output a transaction user interface to be used by the main processor to conduct a transaction, such as between a buyer and a merchant.

Such a transaction may involve receiving transaction information at the secure processor 120 from a transaction object such as a credit card via transaction object reader circuitry 770. The transaction may optionally include processing the transaction information at the secure processor 120 by encrypting it, password-protecting it, stripping out certain information, reformatting it, or converting it from one format to another, or some combination thereof, before sending the transaction information from the secure processor 120 to the main processor 110, after processing if applicable. Once the main processor 110 receives the processed transaction information from the secure processor 120, the main processor 110 then sends the processed transaction information from the main processor 110 to a transaction server such as a credit card server or bank server via a wired or wireless network interface, where the transaction server ensures that an appropriate transaction amount is transferred from a buyer account to a merchant account. The transaction user interface may incorporate a number of user interfaces that, for example, can assist the buyer or merchant in identifying/tabulating/totaling purchased items and amounts, instruct the buyer or merchant as to when to swipe or insert or tap or remove a transaction card or other transaction object, or ask the buyer about memberships associated with the merchant, charity donations to give along with the transaction, tip percentages/amounts associated with the transaction, whether the buyer wants a paper/plastic bag and if so what kind, and the like.

Step 210 includes outputting a first output via the output device while the switch 130 is in the first state in which the main processor 110 is electrically coupled through the switch 130 to the output device 170 as discussed with respect to FIGS. 1A-1C. Various format conversions, such as digital to analog, may occur between step 205 and 210, as discussed with respect to the instruction signals 140, output device circuitry 150, and output signals 160 of FIGS. 1A-1C. The output in the example above would be the transaction user interface.

Step 210 may alternately be followed by step 205, step 215, or step 225.

Step 215 includes detecting, at a secure processor 120 and via tamper detection circuitry electrically coupled to the secure processor 120, an attempt to tamper with a secure enclosure.

The tamper detection circuitry can include a variety of different types of sensors and sensing methods. The tamper detection circuitry can use a "tamper mesh," in which two long conductive tamper trace lines run in parallel and in a zig-zagging or boustrophedonic pattern that covers at least a majority of at least one surface of the secure enclosure 180. The two tamper trace lines are at different voltages, and the tamper detection circuitry includes voltage sensors that detect any changes in voltage along either or both lines. A malicious party attempting to drill into the secure enclosure 180 would likely break at least one of these conductive trace lines, connect the two lines together via the conductive metal of the drill itself, short two portions of the same line together via the conductive metal of the drill itself, or some combination thereof-all of which can be detectable as a voltage fluctuation/change over a predefined voltage change threshold as measured via the voltage sensors. The tamper detection circuitry can include inductive sensors that detect nearby objects that are metal or have conductive properties in response to an inductive sensor measurement exceeding a predefined threshold. The tamper detection circuitry can include capacitive sensors that detect touches to surface(s) of the secure enclosure 180 in response to a capacitive sensor measurement exceeding a predefined threshold, where the surface(s) of the secure enclosure 180 should remain internal and should not be touched. The detection of step 210 may include any of these sensors or any combination thereof.

Step 220 includes toggling the switch 130 from the first state to a second state via the secure processor 120 in response to detecting the attempt to tamper with the secure enclosure. In the second state, the secure processor 120 is electrically coupled through the switch 130 to the output device 170 as discussed with respect to FIGS. 1A-1C.

Step 225 includes detecting, at a secure processor 120, that the main processor 110 is likely to be compromised. This detection may be based on receipt of a warning by the secure processor 120 from security software and/or hardware. For example, such a warning may include an indication of unexpected or unsanctioned network activity from a firewall, an indication of virus detection from an antivirus program, an indication of adware detection from an anti-adware program, an indication of spyware detection from an anti-spyware program, an indication of malware detection from an anti-malware program, or some combination thereof. This detection may additionally or alternatively be based on detection of unusual behavior at the main processor 110, such as if the main processor 110 attempts to output a "spoof" of a user interface normally output through or in conjunction with the secure processor 120. Such as "spoof" user interface might, for example, attempt to simulate an "enter PIN" or "enter signature" user interface that would normally send the resulting PIN or signature from the user to the secure processor 120, but where the "spoof" version would instead collect the PIN or signature from the user at the main processor 110. A malicious party taking over the main processor 110 could then steal sensitive information, such as a PIN or signature, from a user. Therefore, detection of such as "spoof" interface by searching for similarities to legitimate security interfaces would be one way to detect that the main processor 110 is likely to be compromised at step 225.

Step 230 includes toggling the switch 130 from the first state to a second state via the secure processor 120 in response to detecting that the main processor 110 is likely to be compromised.

Step 235 includes transmitting a second output instruction from the secure processor 120 to the output device 170 through the switch 130 while the switch 130 is in the second state. Step 235 here could be preceded by step 220 and/or 230 and can occur in response to either or both of those. The second output instruction here could a warning user interface indicating that the POS device is likely tampered with or compromised based on the detections of step 215 and/or 225.

Step 240 includes outputting a second output via the output device while the switch 130 is in the second state. Various format conversions, such as digital to analog, may occur between step 235 and 240, as discussed with respect to the instruction signals 140, output device circuitry 150, and output signals 160 of FIGS. 1A-1C. The output in the example above would be the warning user interface.

Figure 2B:
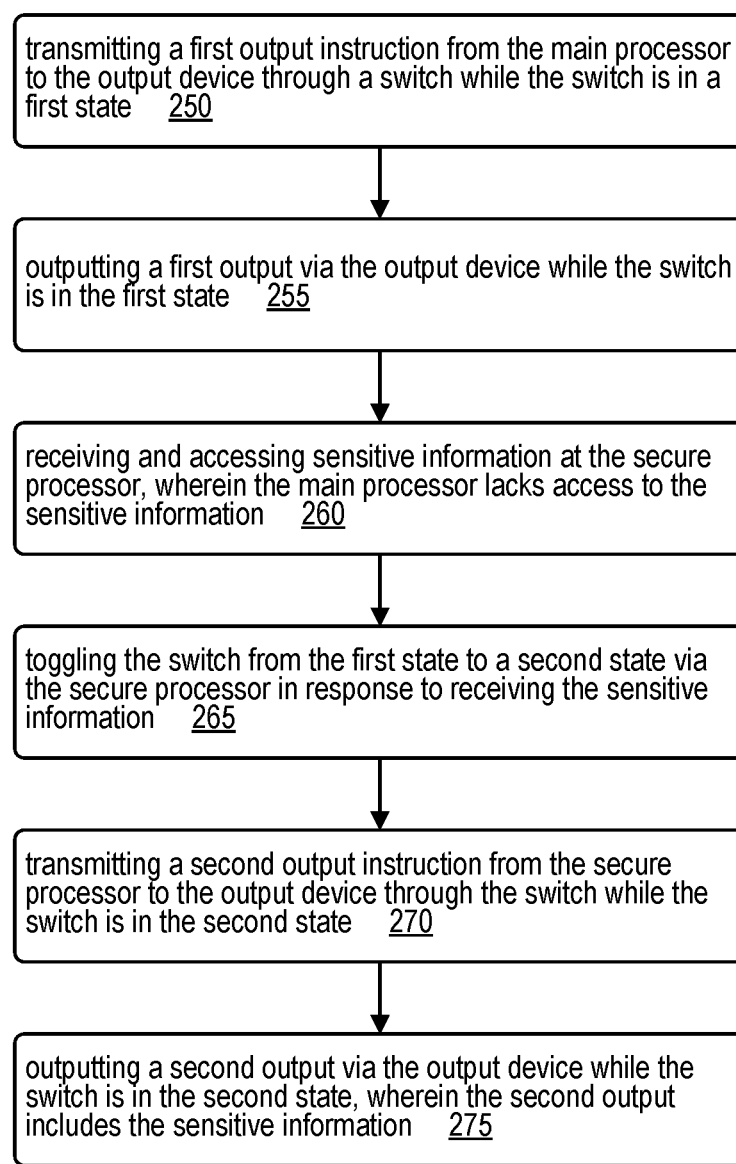
FIG. 2B is a flow diagram illustrating switching from a first state in which a main processor controls an output device to a second state in which a secure processor controls an output device in response to receipt of sensitive information at the secure processor.

FIG. 2B is a flow diagram illustrating switching from a first state in which a main processor controls an output device to a second state in which a secure processor controls an output device in response to receipt of sensitive information at the secure processor.

Step 250 includes transmitting a first output instruction from the main processor 110 to the output device through a switch 130 while the switch 130 is in a first state. This is similar to step 205 of FIG. 2A, and the same notes apply.

Step 255 includes outputting a first output via the output device while the switch 130 is in the first state. This is similar to step 210 of FIG. 2A, and the same notes apply.

Step 260 includes receiving and accessing sensitive information at the secure processor 120, wherein the main processor 110 lacks access to the sensitive information.

The sensitive information can include different types of data and can come from a different sources/components. The sensitive information may include payment object information, such as a credit or debit card number, expiration date, or security code, or some combination thereof received from transaction object reader circuitry 770. The sensitive information may include personal user financial information, such as a bank account balance, a debt amount, an interest rate, an unpaid bill, a paid bill, or some combination thereof received from a wired and/or wireless network interface. The sensitive information may include a PIN code, signature, or user interface selection from a keypad, keyboard, mouse, touchscreen, or touch-sensitive surface of the POS device, or a touch-sensitive or a memory within the secure enclosure 180.

The sensitive information may be scrambled, encrypted, password-protected, or otherwise difficult to read. The term "access" as used with respect to step 260 thus may refer to read access, indicating that the main processor 110 cannot read and/or decrypt and/or unscramble the sensitive information even though it might be capable of retrieving an encrypted, scrambled, or password-protected copy of the sensitive information. On the other hand, the term "access" as used with respect to step 260 may simply refer to the ability (or lack thereof) of the main processor 110 to retrieve any copy of the sensitive information, encrypyted/scrambed/protected or not.

Step 265 includes toggling the switch 130 from the first state to a second state via the secure processor 120 in response to receiving the sensitive information.

Step 270 includes transmitting a second output instruction from the secure processor 120 to the output device through the switch 130 while the switch 130 is in the second state.

Step 275 includes outputting a second output via the output device while the switch 130 is in the second state, wherein the second output includes the sensitive information. Various format conversions, such as digital to analog, may occur between step 270 and 275, as discussed with respect to the instruction signals 140, output device circuitry 150, and output signals 160 of FIGS. 1A-1C.

Figure 3A:
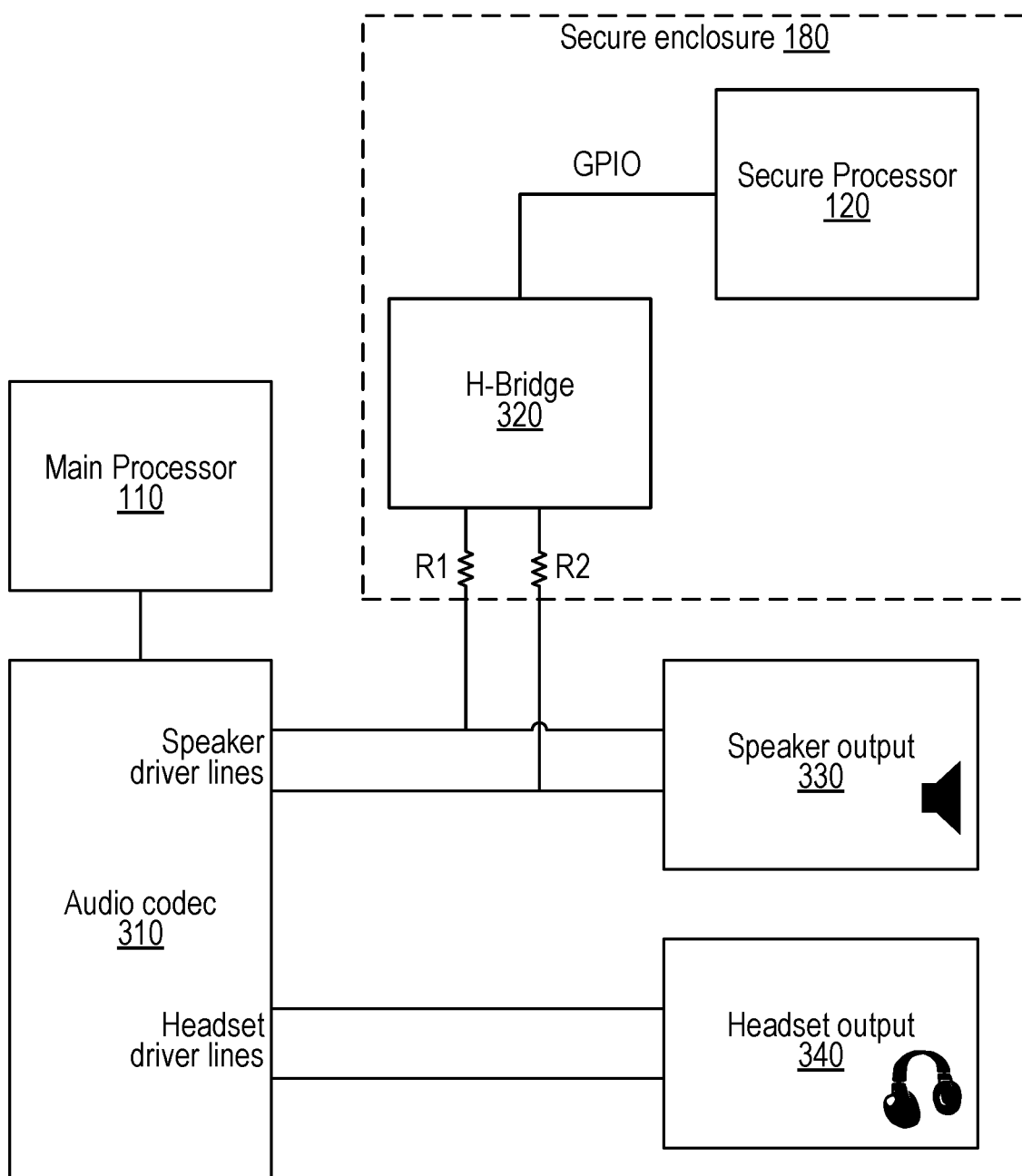
FIG. 3A is a block diagram illustrating a main processor and a secure processor sharing a speaker output device via an H-bridge.

FIG. 3A is a block diagram illustrating a main processor and a secure processor sharing a speaker output device via an H-bridge.

The main processor 110 of FIG. 3A includes or is connected to an audio codec 310, which is illustrated in FIG. 3A as an audio codec ASIC separate from the main processor 110, but may be implemented at least partially in the main processor via software, hardware, or some combination thereof. The audio codec 310 includes speaker driver lines that drive a speaker output 330. The audio codec 310 includes headset driver lines that drive a headset output 340.

The secure processor 120 of FIG. 3A is housed within a secure enclosure 180 along with an H-bridge 320. The secure processor 150 controls and/or drives the H-bridge 320, for example via general purpose input/output (GPIO) pins/connectors of the secure processor 120. The H-bridge 320 is connected to the speaker driver lines and/or to the speaker output 330 via resistors R1 and R2 of FIG. 3A. Resistors R1 and R2 may be within the secure enclosure 180 as illustrated in FIG. 3A, or outside of it.

Figure 3B:
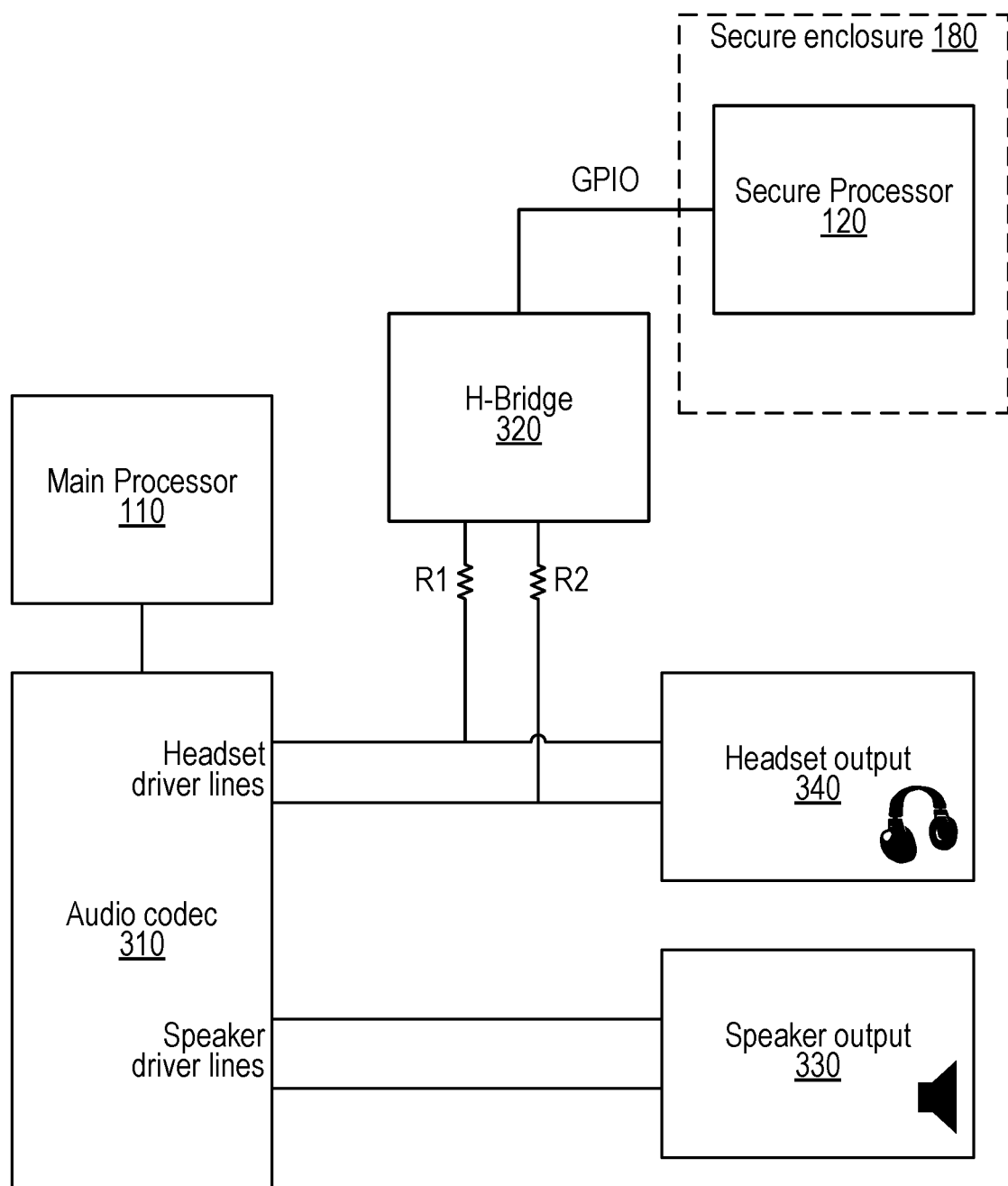
FIG. 3B is a block diagram illustrating a main processor and a secure processor sharing a headset output device via an H-bridge.

FIG. 3B is a block diagram illustrating a main processor and a secure processor sharing a headset output device via an H-bridge.

The main processor 110 of FIG. 3B includes or is connected to the audio codec 310 as in FIG. 3A.

The secure processor 120 of FIG. 3A is housed within a secure enclosure 180. The H-bridge 320 of FIG. 3B is outside of the security enclosure, unlike in FIG. 3B.

The H-Bridge 320 may be driven with power from the secure processor 120, the main processor 110, a battery within or outside of the secure enclosure 180, some other power source, or some combination thereof. The speaker output 330 may be driven with power from the secure processor 120, the main processor 110, a battery within or outside of the secure enclosure 180, some other power source, or some combination thereof. The headset output 340 may be driven with power from the secure processor 120, the main processor 110, a battery within or outside of the secure enclosure 180, some other power source, or some combination thereof.

An output-sharing circuit can be made with any combination of features/elements illustrated in and/or discussed with respect to FIGS. 1A-1C, FIGS. 3A-3B, FIGS. 4A-4E, FIGS. 5A-5B, FIGS. 6A-6B, or FIG. 7.

Figure 4A:
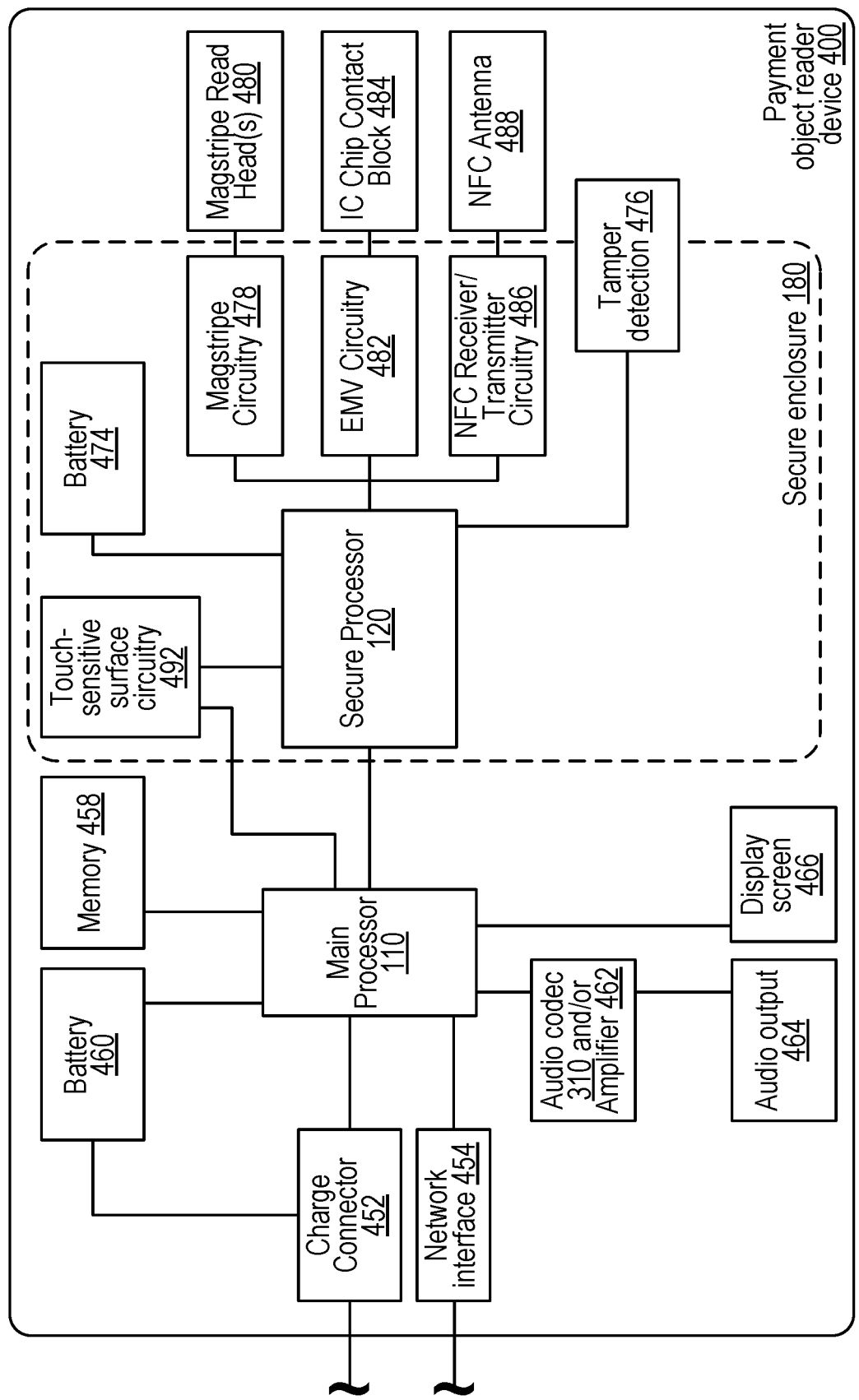
FIG. 4A is a block diagram of a payment object reader device with a display screen, an audio output, a main processor, and a secure processor.

FIG. 4A is a block diagram of a payment object reader device with a display, an audio output, a main processor, and a secure processor.

The payment object reader device 400 of FIG. 4A includes a main processor 110 that is electrically coupled to a memory 458, a battery 460, a charge and/or communication connector 452, a network interface 454, an audio output 464 via an audio codec 310 and/or amplifier 462, a display screen 466, touch-sensitive surface circuitry 492, and the secure processor 120 within the secure enclosure 180.

The touch-sensitive surface circuitry 492 may be a touch-sensitive layer that detects touches of a touchscreen whose display screen portion is the display screen 466. Having the touch-sensitive surface circuitry 492 in the secure enclosure 180 and connected to both the secure processor 120 and the main processor 110 allows sensitive user inputs, such as a personal identification number (PIN) code or a password or a personal telephone number, to be routed to the secure processor 120, while non-sensitive user inputs can be routed to the main processor 110.

The secure processor 120 is electrically coupled to a separate battery 474, the touch-sensitive surface circuitry 492, tamper detection circuitry 476 of the secure enclosure 180 itself, one or more magstripe read head(s) 480 for reading magnetic stripe transaction cards, and various transaction object reader circuitry 770. The transaction object reader circuitry 770 of FIG. 4A includes magstripe circuitry 478 corresponding to the magstripe read head(s) 480, an integrated circuit (IC) chip contact block 484 for reading IC chip cards, Europay/Mastercard/Visa (EMV) circuitry 482 corresponding to the IC chip contact block 484, a near field communication (NFC) antenna 488 for receiving information from a NFC-capable transaction object and/or sending information to the NFC-capable transaction object, and NFC receiver and/or transmitter circuitry 486 corresponding to the NFC antenna 488.

Figure 7:
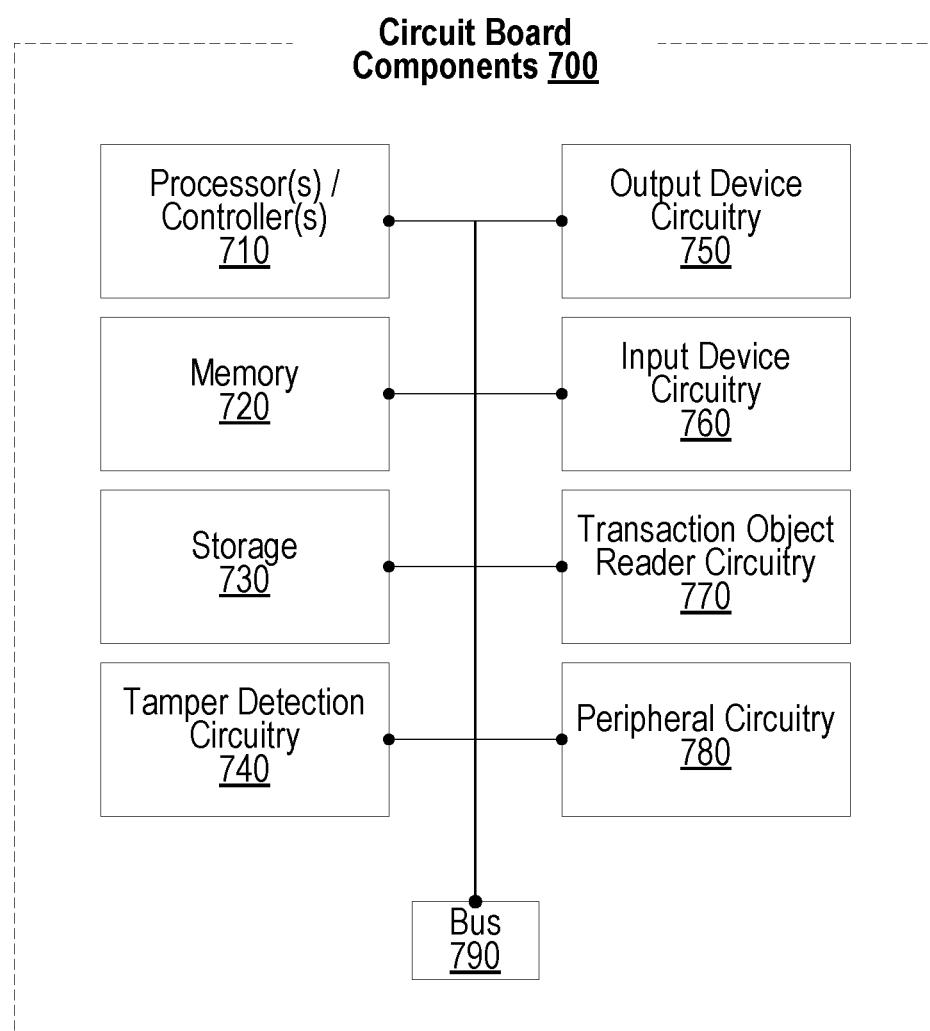
FIG. 7 is a block diagram of exemplary components that may be present on the circuit board.

The transaction object reader circuitry 770 of FIG. 4A may read transaction information from any type of transaction object discussed with respect to the transaction object reader circuitry 770 of FIG. 7. The transaction information may be formatted, password-protected, and/or encrypted by the secure processor 120, by the various circuitries within the transaction object reader circuitry 770 of FIG. 4A, or some combination thereof. The transaction information may then be sent from the secure processor 120 to the main processor 110, which may then send it to an appropriate transaction server via the network interface 454, which may be a wired or wireless network interface and may include a Bluetooth® transceiver, a Bluetooth® Low Energy® transceiver, a 802.11 Wi-Fi transceiver, a wireless local area network (WLAN) transceiver, an Ethernet transceiver, a local area network (LAN) transceiver, or some combination thereof. The transaction server may be a bank server, a credit card or debit card issuer server, or any other server associated with the type of transaction object.

The audio output 464 may be a speaker output 330, a headset output 340, any other type of audio circuitry discussed with respect to the output device circuitry 750 of FIG. 7, or some combination thereof. The display screen 466 may be any type of display screen discussed with respect to the output device circuitry 750 of FIG. 7.

The charge and/or communication connector 452 may be a port, a plug, or a wireless transceiver, or some combination thereof, and can be used to connect the payment object reader device 400 to a power source. The portable computing device can provide power to the payment object reader device 400. The charge and/or communication port 452 can be, for example, a Universal Serial Bus (USB) port, an Apple® Lightning® port, or a TRS or TRRS audio/microphone jack port. Power coming into the payment object reader device 400 via the charge and/or communication port 452 can power the main processor 110, the secure processor 120, audio output 464, display screen 466, the transaction object reader circuitry 770 of FIG. 4A, the battery 460, the battery 474, or some combination thereof.

Figure 4B:
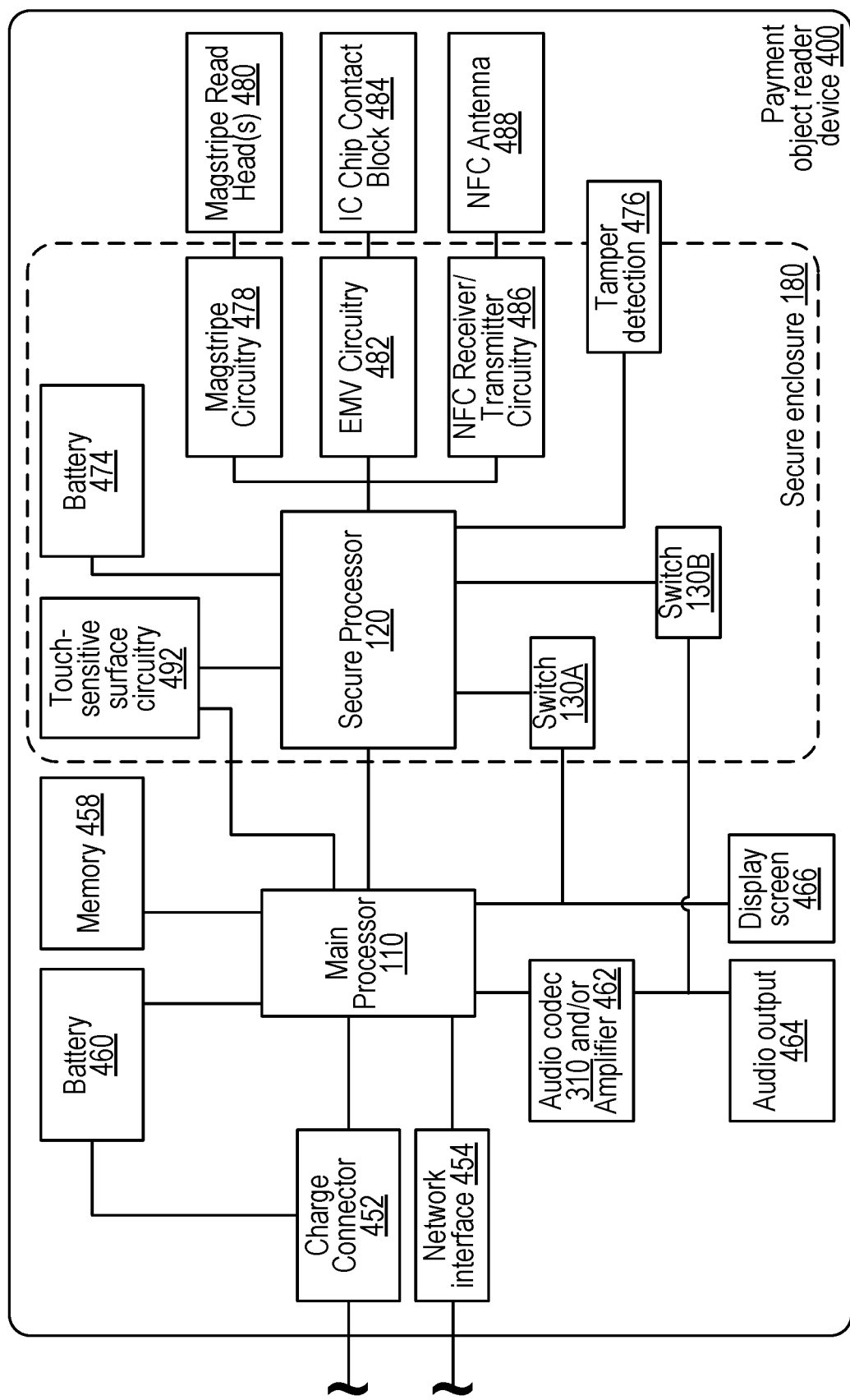
FIG. 4B is a block diagram of the payment object reader device of FIG. 4A with switches added permitting sharing of the display screen and audio output between the main processor and the secure processor, where the switches are within the secure enclosure.

FIG. 4B is a block diagram of the payment object reader device of FIG. 4A with switches added permitting sharing of the display screen and audio output between the main processor and the secure processor, where the switches are within the secure enclosure.

In particular, switch 130A of FIG. 4B permits sharing of the audio output 464 between the main processor 110 and the secure processor 120 in a similar fashion to that illustrated in FIGS. 1A-1C. Switch 130B of FIG. 4B permits sharing of the display screen 466 between the main processor 110 and the secure processor 120, also similarly to FIGS. 1A-1C.

Figure 4C:
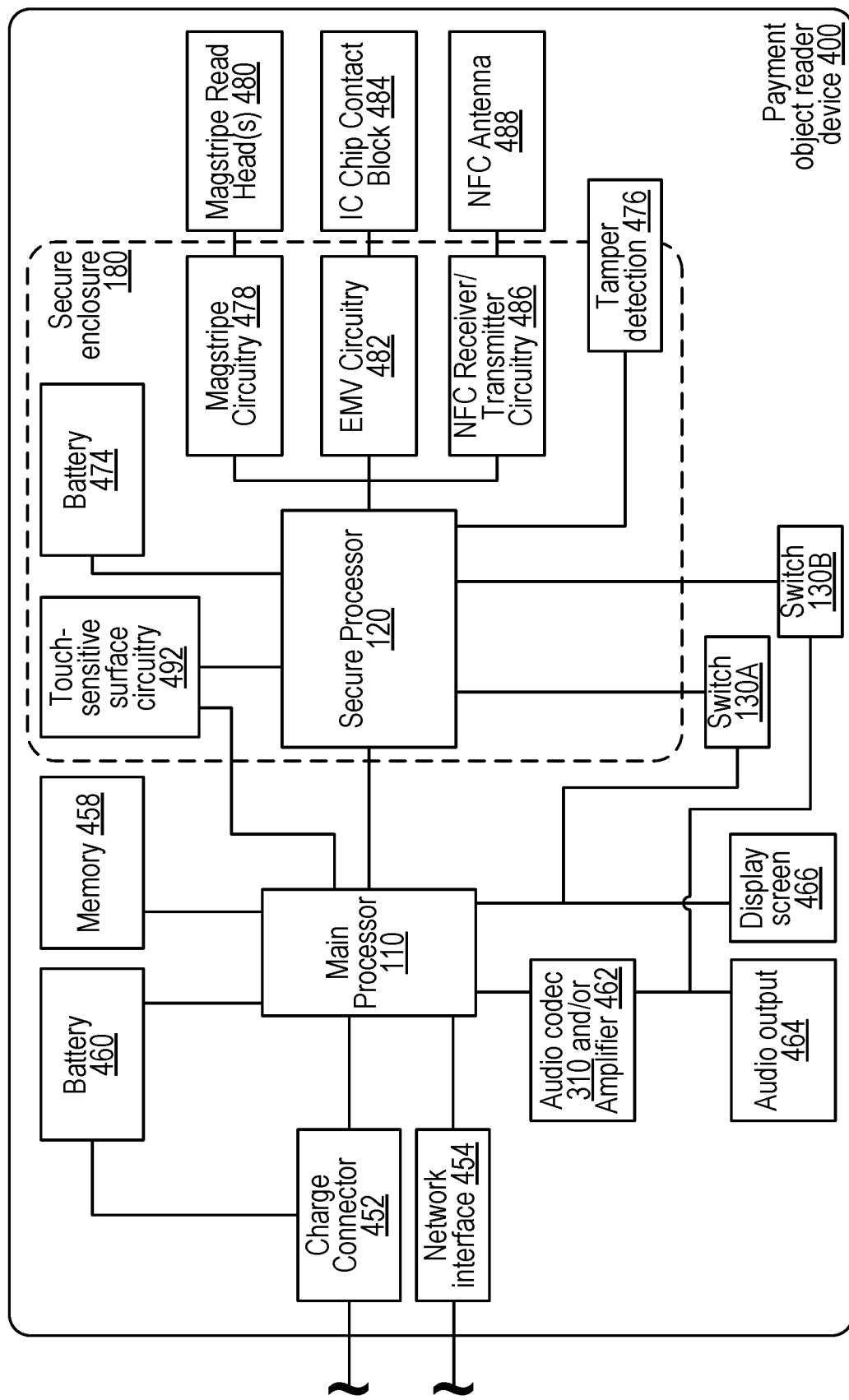
FIG. 4C is a block diagram of the payment object reader device of FIG. 4A with switches added permitting sharing of the display screen and audio output between the main processor and the secure processor, where the switches are outside of the secure enclosure.

FIG. 4C is a block diagram of the payment object reader device of FIG. 4A with switches added permitting sharing of the display screen and audio output between the main processor and the secure processor, where the switches are outside of the secure enclosure.

Like FIG. 4B, switch 130A of FIG. 4C permits sharing of the audio output 464 between the main processor 110 and the secure processor 120, while switch 130B of FIG. 4B permits sharing of the display screen 466 between the main processor 110 and the secure processor 120. The switches 130A/B of FIG. 4C operate similarly to the switch 130 of FIGS. 1A-1C, though the switches 130A/B of FIG. 4C are outside of the secure enclosure 180, generally making their operation less secure than if they were within the secure enclosure 180 as in FIG. 4B.

Figure 4D:
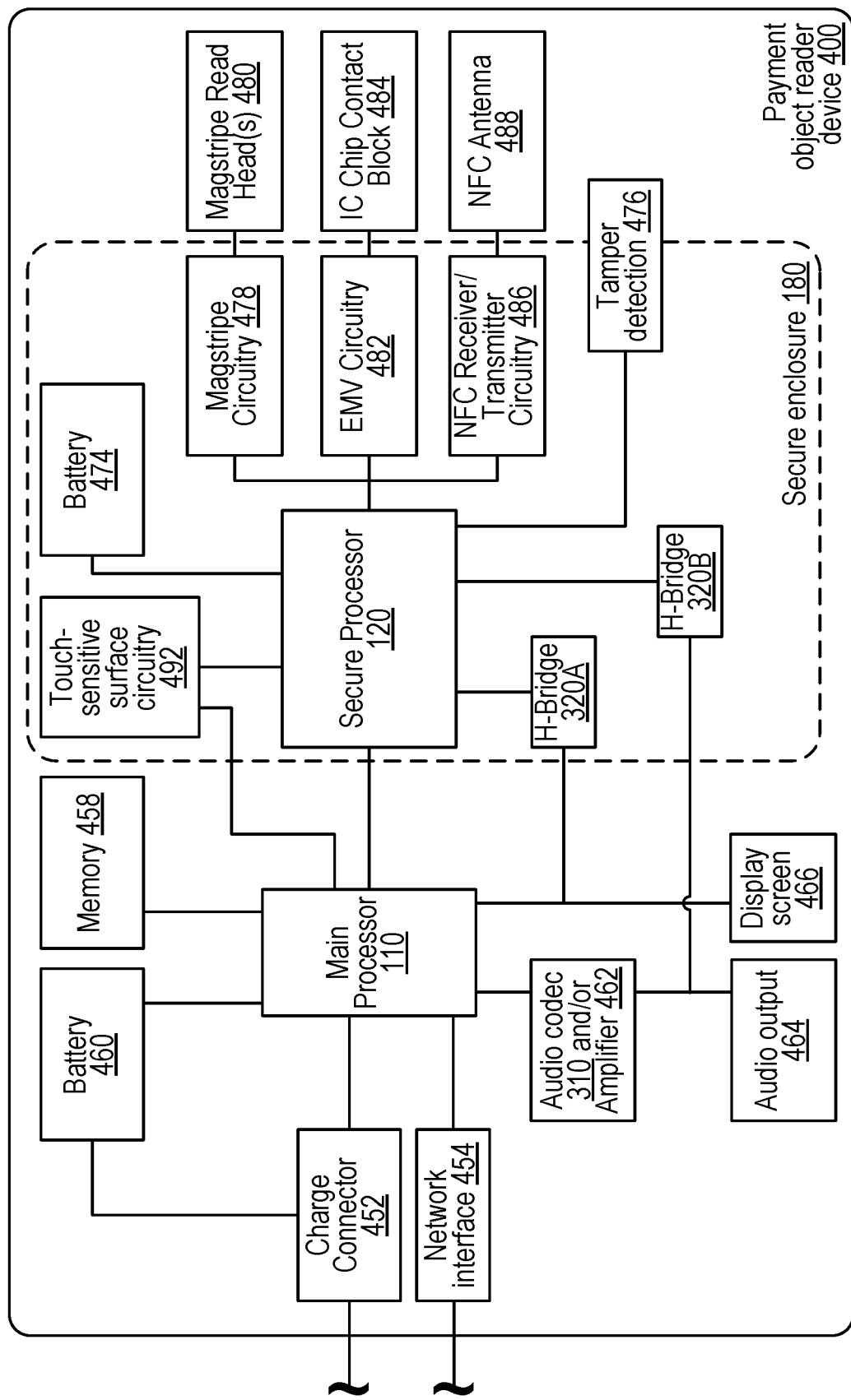
FIG. 4D is a block diagram of the payment object reader device of FIG. 4A with H-bridges added permitting sharing of the display screen and audio output between the main processor and the secure processor, where the H-bridges are within the secure enclosure.

FIG. 4D is a block diagram of the payment object reader device of FIG. 4A with H-bridges added permitting sharing of the display screen and audio output between the main processor and the secure processor, where the H-bridges are within the secure enclosure.

The H-bridge 320A of FIG. 4D permits sharing of the audio output 464 between the main processor 110 and the secure processor 120 in a similar manner to the H-Bridge 320 of FIG. 3A. The H-bridge 320B of FIG. 4D permits sharing of the display screen 466 between the main processor 110 and the secure processor 120 in a manner that is also similar to the H-Bridge 320 of FIG. 3A.

Resistors R1 and R2 positioned as in FIG. 3A are not illustrated in FIG. 4D but can be present between each H-bridge 320 and the corresponding audio output 464 or display screen 466.

Figure 4E:
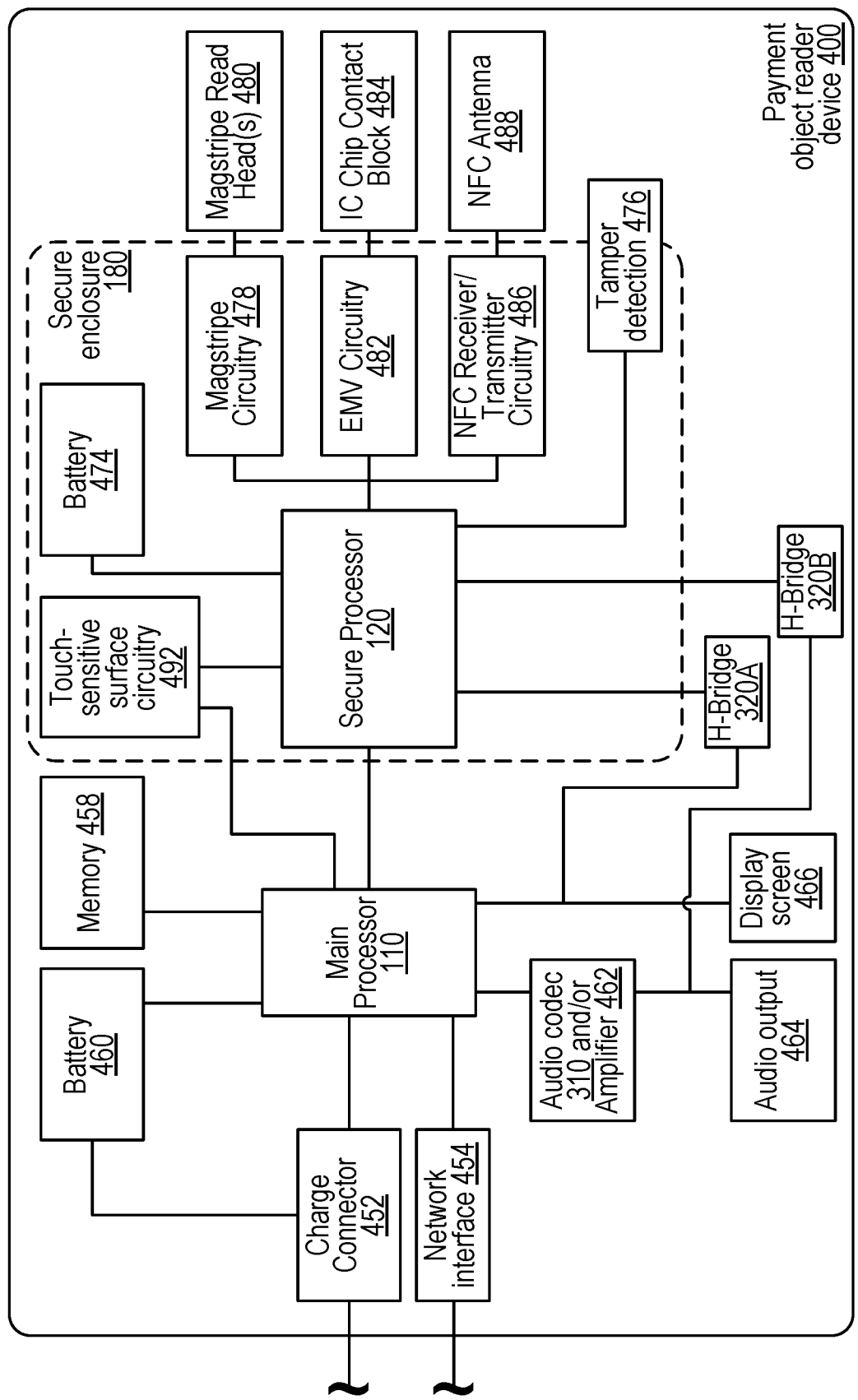
FIG. 4E is a block diagram of the payment object reader device of FIG. 4A with H-bridges added permitting sharing of the display screen and audio output between the main processor and the secure processor, where the H-bridges are outside of the secure enclosure.

FIG. 4E is a block diagram of the payment object reader device of FIG. 4A with H-bridges added permitting sharing of the display screen and audio output between the main processor and the secure processor, where the H-bridges are outside of the secure enclosure.

The H-bridge 320A of FIG. 4E permits sharing of the audio output 464 between the main processor 110 and the secure processor 120 in a similar manner to the H-Bridge 320 of FIG. 3B. The H-bridge 320B of FIG. 4E permits sharing of the display screen 466 between the main processor 110 and the secure processor 120 in a manner that is also similar to the H-Bridge 320 of FIG. 3B.

Resistors R1 and R2 positioned as in FIG. 3B are not illustrated in FIG. 4E but can be present between each H-bridge 320 and the corresponding audio output 464 or display screen 466, either within the secure enclosure 270 or outside of the secure enclosure 270.

Figure 4F:
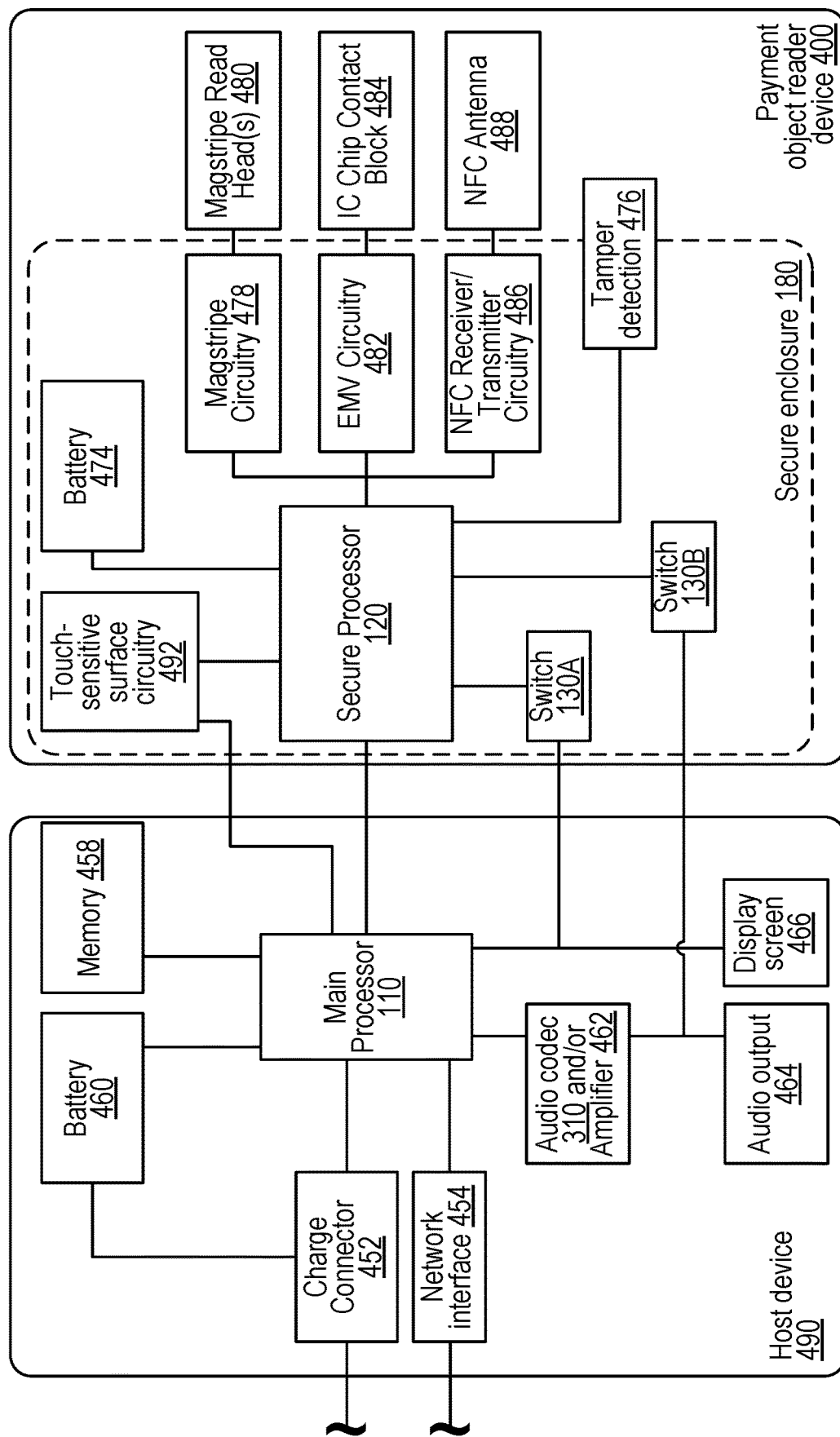
FIG. 4F is a block diagram of the payment object reader device of FIG. 4B, where the payment object reader is separated from a host device.

FIG. 4F is a block diagram of the payment object reader device of FIG. 4B, where the payment object reader is separated from a host device.

The payment object reader device 400 of FIG. 4F includes mainly components associated with the secure processor 120 in FIGS. 4A-4E, while the separate host device 490 includes mainly components associated with the main processor 110 in FIGS. 4A-4E. Any combination of components within either the payment object reader device 400 or the host device 490 may be moved from one device to the other. For instance, the touch-sensitive surface circuitry 492 may be moved to the host device 490, or any or both switches 130 may be moved to the host device 490. In some cases, duplicate components, such as a charge connector 452 or even a main processor 110 outside of the secure enclosure 180, may exist in both the payment object reader device 400 and the host device 490 of FIG. 4F.

The connections between the payment object reader device 400 and the host device 490 of FIG. 4F may be wired or wireless, and may for example use a Universal Serial Bus (USB) connection, an Apple® Lightning® connection, or a TRS or TRRS audio/microphone jack connection, a Bluetooth® connection, a Bluetooth® Low Energy® connection, a 802.11 Wi-Fi connection, a wireless local area network (WLAN) connection, an Ethernet connection, a local area network (LAN) connection, or some combination thereof.

It should be understood that the payment object reader devices 400 of FIGS. 4C-4E can also be "split" into a payment object reader device 400 and a separate host device 490 in a similar manner to the "split" between FIG. 4B and FIG. 4F.

A payment object reader device 400 can be made with any combination of features/elements illustrated in and/or discussed with respect to FIGS. 3A-3B, FIGS. 4A-4F, FIGS. 5A-5B, FIGS. 6A-6B, or FIG. 7.

Figure 5A:
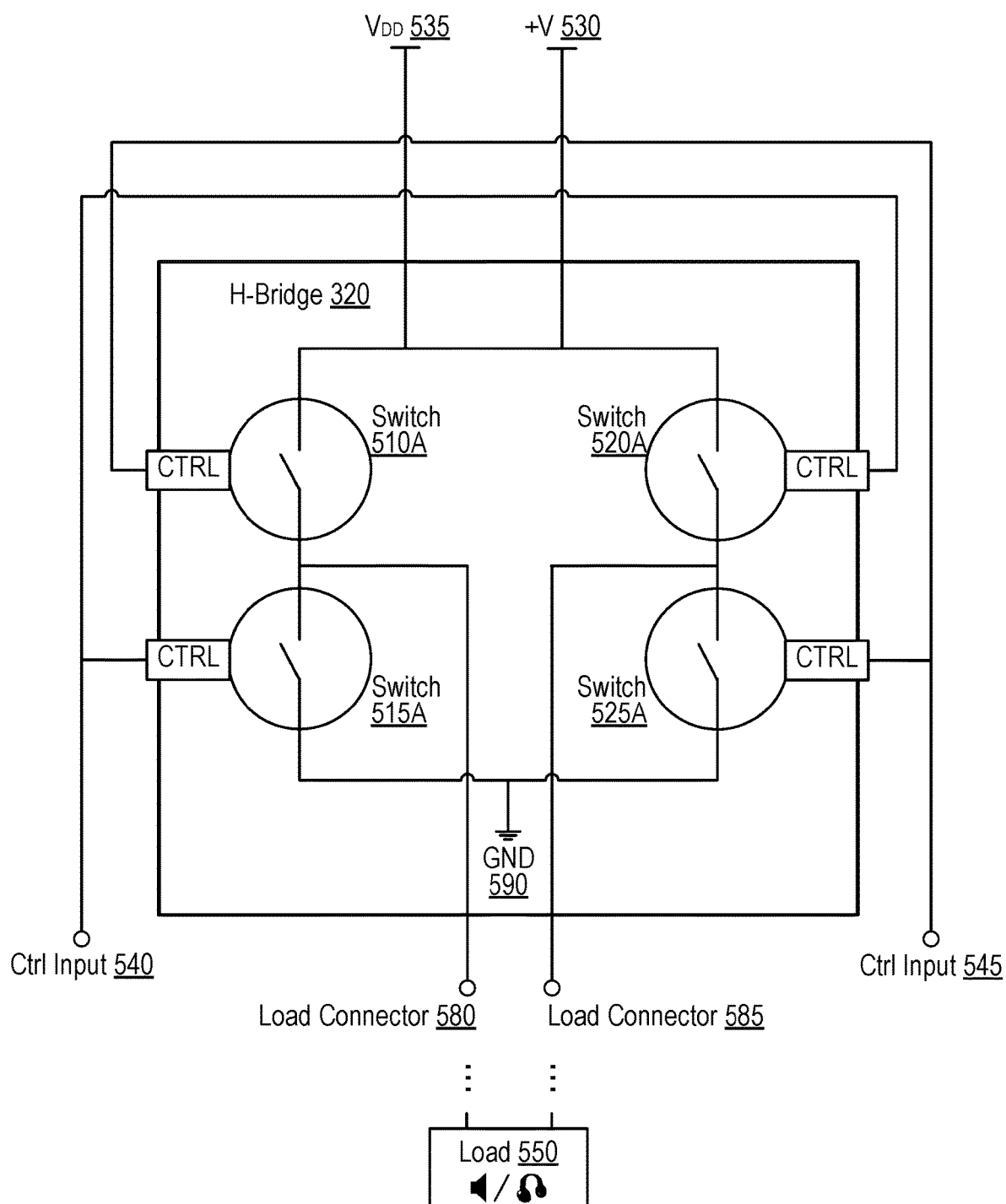
FIG. 5A is a circuit diagram of an H-bridge with switches and two control inputs.

FIG. 5A is a circuit diagram of an H-bridge with switches and two control inputs.

Figure 5B:
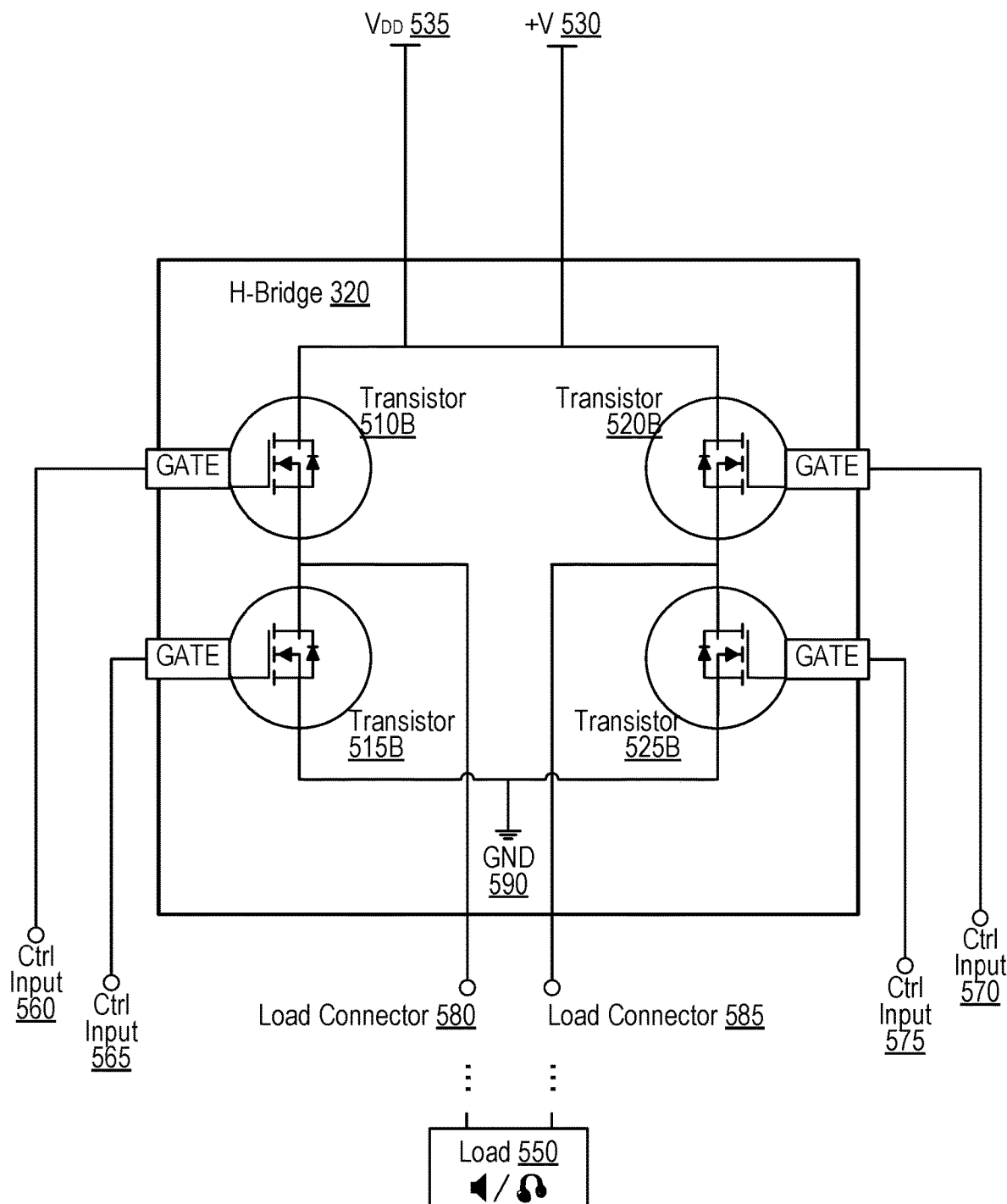
FIG. 5B is a circuit diagram of an H-bridge with transistors and four control inputs.

The H-bridge 320 of FIG. 5A and FIG. 5B includes two load connectors—580 and 585—that connect to a load 550. The load 550 may for example represent the speaker output 330 or headset output 340 of FIG. 3A or FIG. 3B. The load 550 may also represent any output device circuitry 150 or output device 170 discussed with respect to FIG. 5.

The H-bridge 320 of FIG. 5A includes four switches—a switch 510A, a switch 515A, a switch 520A, and a switch 525A. A first control input 540 controls the on/off state of switches 515A and 520A. A second control input 545 controls the on/off state of switches 510A and 525A.

When all of the switches are in their "off" state—that is, when they are all open and not conducting—the secure processor 120 does not drive output (e.g., audio) to the load 550. This state occurs when the first control input 540 and second control input 545 are in an "off" state.

When the first control input 540 is in an "on" state, the switches 515A and 520A are in an "on" state—that is, a closed state—and therefore conduct. Power is driven through the load 550 and through closed switches 515A and 520A.

When the second control input 545 is in an "on" state, the switches 510A and 525A are in an "on" state—that is, a closed state—and therefore conduct. Power is driven through the load 550 and through closed switches 510A and 525A.

The H-bridge 320 of FIGS. 5A and 5B may receive a supply voltage (V+ 530), a logic voltage ($V_{DD}$ 535), or both. The supply voltage (V+ 530) and/or logic voltage ($V_{DD}$ 535) may be supplied by the secure processor 120, the main processor 110, a battery within or outside of the secure enclosure 180, some other power source, or some combination thereof.

FIG. 5B is a circuit diagram of an H-bridge with transistors and four control inputs.

The four switches 510A, 515A, 520A, and 525A of FIG. 5A have been replaced in FIG. 5B with four transistors 510B, 515B, 520B, and 525B.

In FIG. 5B the GATE lines of each transistor go to separate control inputs. That is to say, control input 560 controls the gate line of transistor 510B, control input 565 controls the gate line of transistor 515B, control input 570 controls the gate line of transistor 520B, and control input 575 controls the gate line of transistor 525B.

The H-bridge 320 otherwise functions similarly to the one in FIG. 5A. Typically, control inputs 560 and 575 would be used together to drive the load 550, or control inputs 565 and 570 would be used together to drive the load 550.

The H-bridge 320 can be made with any combination of features/elements illustrated in and/or discussed with respect to FIG. 5A and FIG. 5B or discussed with regard to the same.

Figure 6A:
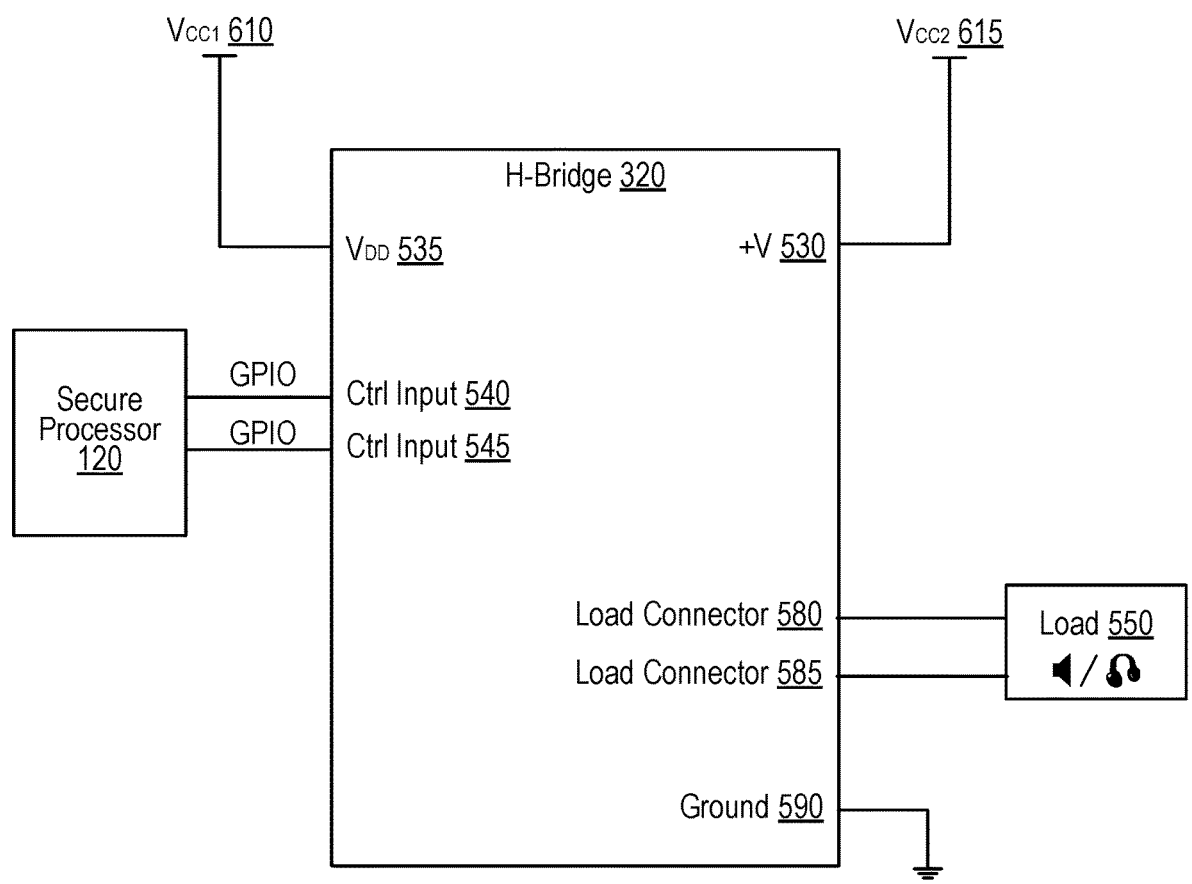
FIG. 6A is a block diagram of an H-bridge ASIC with two control inputs.

FIG. 6A is a block diagram of an H-bridge ASIC with two control inputs.

The H-bridge 320 of FIG. 6A is illustrated as an ASIC block with various connections. The control inputs of FIG. 6A correspond to those of the H-bridge circuit diagram in FIG. 5A—that is, there are two control inputs 540 and 545.

Figure 6B:
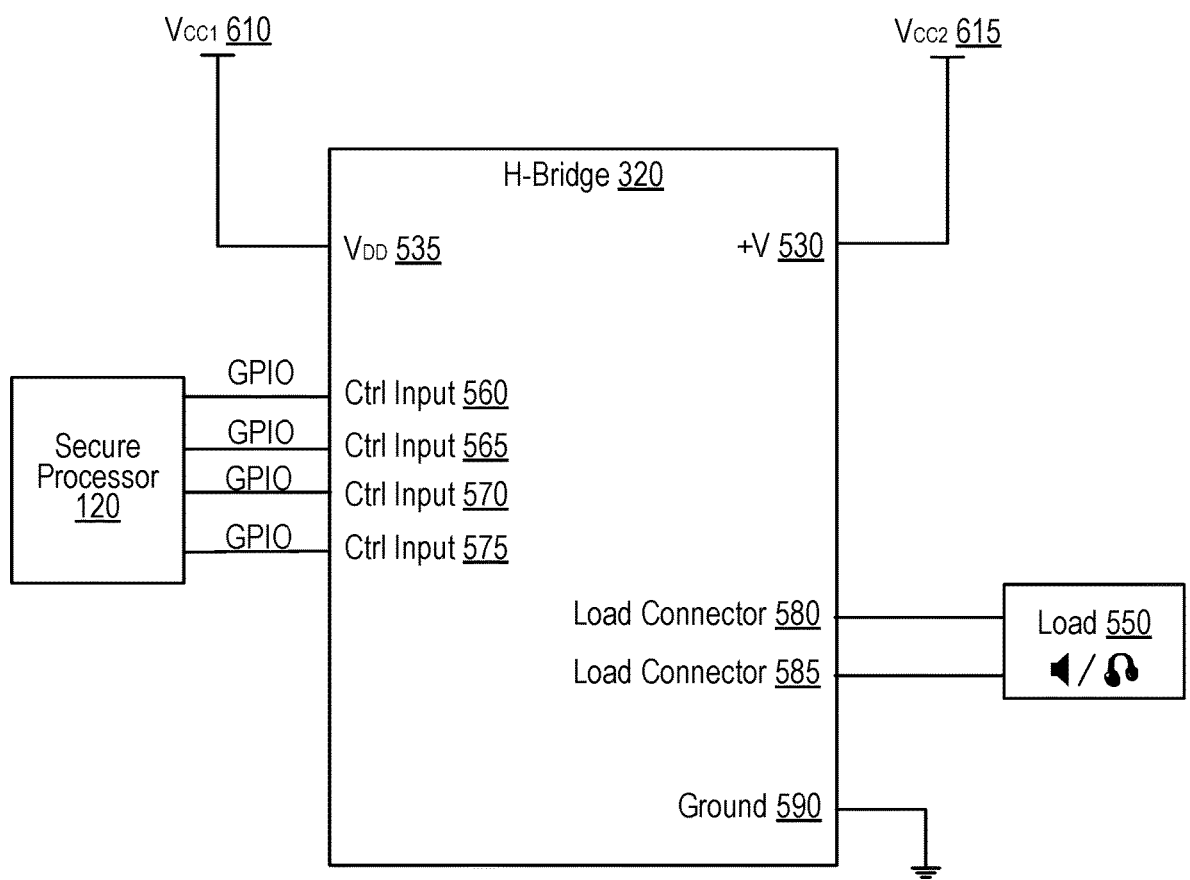
FIG. 6B is a block diagram of an H-bridge ASIC with four control inputs.

The secure processor 120 is illustrated as connecting to the control inputs of FIGS. 6A and 6B via GPIO. The control inputs of FIGS. 6A and 6B may be controlled by the secure processor 120, the main processor 110, another processor, or some combination thereof.

As in FIGS. 5A and 5B, the supply voltage (V+ 530) and/or logic voltage ($V_{DD}$ 535) may be supplied by the secure processor 120, the main processor 110, a battery within or outside of the secure enclosure 180, some other power source, or some combination thereof. In FIGS. 6A and 6B, these are illustrated as supplied by a voltage $V_{CC1}$ 610 and $V_{CC2}$ 615, respectively. Various circuit components, such as filters, resistors, capacitors, inductors, or combinations thereof are not illustrated but may be present between $V_{CC1}$ 610 and $V_{DD}$ 535, and between $V_{CC2}$ 615 and V+ 530. In some cases, $V_{CC1}$ 610 is the same at the voltage as $V_{CC2}$ 615, and may even be the same voltage source.

FIG. 6B is a block diagram of an H-bridge ASIC with four control inputs.

The control inputs of FIG. 6B correspond to those of the H-bridge circuit diagram in FIG. 5B—that is, there are four control inputs 560, 565, 570, and 575.

The H-bridge 320 illustrated in any of FIGS. 3A through 6B may also be used to amplify signals, such as audio signals, going to the load 550 from the secure processor 120 or from another source such as the main processor 110. The H-bridge 320 may be paired with filters, such as low-pass filters, high-pass filters, band-pass filters, or some combination thereof. Such filters may help provide cleaner audio output, since the secure processor 120 might omit an audio codec similar to the audio codec 310 of FIG. 3A and FIG. 3B. On the other hand, the secure processor 120 may use or be connected to an audio codec similar to the audio codec 310 of FIG. 3A and FIG. 3B, which may be coupled to the H-bridge instead of or in addition to the secure processor 120.

In some cases, the H-bridge 320 may be replaced with or supplemented by a switch or transistor set up similarly to the switch illustrated in FIG. 5.

The H-bridge 320 can be made with any combination of features/elements illustrated in and/or discussed with respect to FIG. 5A, FIG. 5B, FIG. 6A, and FIG. 6B or discussed with regard to the same.

FIG. 7 illustrates exemplary circuit board components 700 that may be used to implement an embodiment of the present invention. The circuit board 100 described herein may include any combination of at least a subset of the circuit board components 700. In some embodiments, the circuit board 100 may actually include multiple circuit boards connected in a wired or wireless fashion, some of which may be at least partially enclosed by the security housing.

The circuit board components 700 of FIG. 7 may include one or more processors, controllers, or microcontrollers 710. These may in some cases aid in tamper detection, such as by performing at least some subset of the functions identified in FIG. 7. The circuit board components 700 of FIG. 7 may include one or more memory components 710 that may store, at least in part, instructions, executable code, or other data for execution or processing by the processor or controller 710. The memory components 710 may include, for example, cache memory, random access memory (5 AM), read-only memory (ROM), or some other type of computer-readable storage medium.

The circuit board components 700 of FIG. 7 may further includes one or more computer-readable storage medium(s) 730 for storing data, such as a hard drive, magnetic disk drive, optical disk drive, flash memory, magnetic tape based memory, or another form of non-volatile storage. These may for example, store credit card information, cryptographic keys, or other information, and may in some cases encrypt or decrypt such information with the aid of the processor or controller 710. The computer-readable storage medium(s) 730 may in some cases store, at least in part, instructions, executable code, or other data for execution or processing by the processor or controller 710.

The circuit board components 700 of FIG. 7 may include tamper detection circuitry 740, which may include any of the tamper detection circuit 150 discussed herein, and may include the board connector piece holder(s) 255 and any components discussed in FIG. 7.

The circuit board components 700 of FIG. 7 may include output device circuitry 750, which may include, for example, communication circuitry for outputting data through wired or wireless means, display circuitry for displaying data via a display screen, audio circuitry for playing audio via headphones or a speaker, printer circuitry for printing data via a printer, or some combination thereof. The display screen may be a liquid crystal display (LCD), a plasma display, an organic light-emitting diode (OLED) display, an electronic ink display, a projector-based display, a holographic display, or some combination thereof. The printer may be inkjet, laserjet, thermal, or some combination thereof. In some cases, the output device circuitry 750 may allow for transmission of data over an headphone audio jack, a microphone jack, BLUETOOTH™ wireless signal transfer, radio-frequency identification (RFID), near-field communications (NFC), 802.11 Wi-Fi, cellular network data transfer, or some combination thereof. The output device circuitry 750 may also include The circuit board components 700 of FIG. 7 may include input device circuitry 760, which may include, for example, communication circuitry for outputting data through wired or wireless means, microphone circuitry for receiving audio data, user interface circuitry for receiving user interface inputs, or some combination thereof, and may include variable pressure detection. Touchscreens may be capacitive, resistive, acoustic, or some combination thereof. In some cases, the input device circuitry 760 may allow receipt of data over an headphone audio jack, a microphone jack, BLUETOOTH™ wireless signal transfer, radio-frequency identification (RFID), near-field communications (NFC), 802.11 Wi-Fi, cellular network data transfer, or some combination thereof. Input device circuitry 760 may receive data from an alpha-numeric keypad or keyboard, a pointing device, a mouse, a trackball, a trackpad, a touchscreen, a stylus, cursor direction keys, or some combination thereof. The input device circuitry 760 may also receive data from the transaction object reader circuitry 770.

The circuit board components 700 of FIG. 7 may include transaction object reader circuitry 770, which may include components capable of reading information from a transaction object, or may include circuitry supporting components capable of reading information from a transaction object, with the actual object reader components located off of the circuit board 100. The transaction object reader 770 may include at least one card reader. In this case, the transaction object may be a magnetic stripe onboard a transaction card, an integrated circuit (IC) chip onboard a transaction card, and/or a smartcard chip onboard a transaction card. The transaction card itself may be a credit card, a debit card, an automated teller machine (ATM) card, a gift card, a transit card, an identification card, a game token card, a ticket card, a bank card associated with a bank account, a credit union card associated with a credit union account, an online gaming card associated with an online gaming account, a healthcare card associated with a health savings account (HSA) or flexible spending account (FSA), or a user account card associated with a user account of another type, or some combination thereof. The transaction object reader 770 may include at least one wireless signal reader for reading information wirelessly. In this case, the transaction object may be any of the transaction-card-related transaction objects discussed above (but read wirelessly), or they may be non-card objects capable of wireless communication, such as smartphones, tablets, wearable devices, active near field communication (NFC) and/or radio-frequency identification (RFID) tags, passive NFC and/or RFID tags, or other mobile devices that are capable of wireless communication via NFC, RFID, Bluetooth®, Bluetooth® Low Energy®, WLAN, Wi-Fi, or some combination thereof.

Transaction object reader circuitry 770 may include, for example, a magnetic read head or other type of magnetic stripe reader that is capable of reading information from a magnetic stripe of a transaction card. Transaction object reader circuitry 770 can also include an integrated circuit (IC) chip reader and/or smartcard chip reader for reading an IC chip and/or smartcard chip embedded in a transaction card. Such an IC chip/smartcard chip can follow the Europay-Mastercard-Visa (EMV) payment chip standard. The IC chip/smartcard chip reader can be contact-based, in that it can include one or more conductive prongs that contact a conductive metal contact pad of the IC chip/smartcard chip. The IC chip/smartcard chip can instead be contactless and use a contactless antenna. The contactless antenna can also double as a receiver for near-field-communication (NFC) signals, radio-frequency identification (RFID) signals, Bluetooth® wireless signals, wireless local area network (WLAN) signals, 802.xx Wi-Fi signals, or some combination thereof, which can be sent from a transaction card or from a another type of transaction object as discussed above. In some cases, a transaction object may only send these wireless signals in response to receipt of a magnetic field or other wireless signals from the transaction object reader circuitry 770. For example, if the transaction object is a passive NFC/RFID tag or functions based on similar technology, it generates energy from the magnetic field or other wireless signals from the transaction object reader circuitry 770 via induction coil(s) that is then used to transmit the wireless signals that are ultimately read by the transaction object reader circuitry 770.

The information read from the transaction object by the transaction object reader circuitry 770, regardless of the type of the transaction object, may include at least credit card information, debit card information, automated teller machine (ATM) information, gift card account information, transit account information, identification card information, game token card information, ticket information, bank account information, credit union account information, online gaming account information, HSA/FSA account information, health insurance account information, healthcare information, or some combination thereof. Certain terms discussed herein should be understood to refer to transaction objects, including but not limited to "payment object," "transaction object," "financial object," "payment card," "transaction card," or "financial card."

Peripheral circuitry 780 may include any type circuitry permitting connection and use of computer support devices to add additional functionality to the circuit board 100. For example, peripheral circuitry 780 may support connection of a modem or a router. The components shown in FIG. 7 are depicted as being connected via a single bus 790. However, the components may be connected through one or more data transport means. For example, processor unit 710 and main memory 710 may be connected via a local microprocessor bus, and the storage medium 730, tamper detection circuitry 740, output device circuitry 750, input device circuitry 760, transaction object reader circuitry 770, and peripheral circuitry 780 may be connected via one or more input/output (I/O) buses.

While various flow diagrams have been described above, it should be understood that these show a particular order of operations performed by certain embodiments of the invention, and that such order is exemplary. Alternative embodiments can perform the operations in a different order, combine certain operations, or overlap certain operations illustrated in or described with respect to each flow diagram.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The invention claimed is:

1. A system for controlling access to an interface device, the system comprising:
   a processor that communicates with the interface device through a switch while the switch is in a first state;
   the switch, wherein the switch toggles from the first state to a second state in response to detection of a suspicious behavior associated with the processor, wherein the switch electrically couples the interface device to the processor in the first state, wherein the switch electrically decouples the interface device from the processor in the second state; and
   the interface device, wherein the interface device communicates with the processor through the switch to operate a user interface using the interface device while the switch is in the first state.

2. The system of claim 1, wherein the interface device includes an output device.

3. The system of claim 1, wherein the interface device includes an input device.

4. The system of claim 1, wherein the interface device includes a codec.

5. The system of claim 1, wherein the interface device includes a touchscreen.

6. The system of claim 1, wherein the interface device includes at least one of a speaker, a headset, or a microphone.

7. The system of claim 1, wherein the interface device includes a network communication interface that communicates over a network.

8. The system of claim 1, further comprising:
   tamper detection circuitry, wherein the suspicious behavior is associated with a tamper attempt detected using the tamper detection circuitry.

9. The system of claim 1, wherein the suspicious behavior is associated with network activity.

10. The system of claim 1, wherein the suspicious behavior is associated with a malfunction by the processor.

11. The system of claim 1, wherein the suspicious behavior is associated with data to be received by the processor.

12. The system of claim 1, wherein the suspicious behavior is associated with data to be output by the processor.

13. The system of claim 1, wherein the processor is prevented from performing a specific type of operation while the switch is in the second state.

14. The system of claim 1, further comprising:
   a diode that prevents data flow across the switch in a first direction to restrict data flow across the switch to a second direction.

15. The system of claim 1, further comprising:
   a second processor, wherein the switch electrically couples the interface device to the second processor in the second state, wherein the switch electrically decouples the interface device from the second processor in the first state.

16. The system of claim 1, further comprising:
   a second processor that detects the suspicious behavior associated with the processor, wherein the second processor causes the switch to toggle from the first state to the second state in response to the detection of the suspicious behavior by the second processor.

17. The system of claim 1, wherein the processor detects the suspicious behavior associated with the processor, wherein the processor causes the switch to toggle from the first state to the second state in response to the detection of the suspicious behavior by the processor.

18. A method controlling access to an interface device, the method comprising:
- conveying one or more communications between a processor and the interface device through a switch to operate a user interface using the interface device while the switch is in a first state, wherein the switch electrically couples the interface device to the processor in the first state;
- detecting a suspicious behavior associated with the processor, and
- toggling the switch from the first state to a second state in response to the detection of the suspicious behavior associated with the processor, wherein the switch electrically decouples the interface device from the processor in the second state.

19. The method of claim 18, wherein the interface device includes an output device.

20. The method of claim 18, wherein the interface device includes an input device.

* * * * *